(12) United States Patent
Doi et al.

(10) Patent No.: US 6,222,617 B1
(45) Date of Patent: Apr. 24, 2001

(54) IMAGE FORMING APPARATUS

(75) Inventors: Masato Doi, Hino; Katsushi Fujita, Sayama; Takao Kubota, Sayama; Yasuaki Tamakoshi, Sayama, all of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/310,199

(22) Filed: May 12, 1999

(30) Foreign Application Priority Data

Sep. 18, 1998 (JP) .................................................. 10-265323
Oct. 8, 1998 (JP) .................................................. 10-286325

(51) Int. Cl.$^7$ .................................................. G03B 27/62
(52) U.S. Cl. .............................. 355/75; 355/76; 396/617; 396/620
(58) Field of Search .................................. 355/72, 75, 76, 355/85, 110; 396/634, 365, 602, 603; 271/196, 276

(56) References Cited

U.S. PATENT DOCUMENTS 5,369,425 * 11/1994 Balzeit et al. ........................ 271/196

FOREIGN PATENT DOCUMENTS 11-006599 * 1/1999 (JP) ........................................ 355/73

* cited by examiner

*Primary Examiner*—D. Rutledge
(74) *Attorney, Agent, or Firm*—Finnegan, Henderson, Farabow, Garrett & Dunner, L.L.P.

(57) ABSTRACT

An exposing apparatus provided with a drum to fixedly hold a sheet-shaped light sensitive material onto an outer peripheral surface thereof by suctioning; a rotating driver capable of rotating the drum at a rotational speed not less than 1200 rpm; and an exposing device for exposing on the basis of image data the light sensitive material fixedly held on the outer peripheral surface of the drum rotated by the rotating driving means.

19 Claims, 26 Drawing Sheets

IMAGE FORMING APPARATUS

BACKGROUND OF THE INVENTION

The present invention relates to an image forming apparatus and an exposing apparatus which exposes a sheet-shaped light sensitive material fixedly held on an outer peripheral surface of a drum rotating at high speed on the basis of image data.

Conventionally, in the exposing apparatus, as a method of fixing the sheet-shaped light sensitive material on a drum, a method based on electrostatic adsorption, a method of fixing by holding mechanically an end of the sheet-shaped light sensitive material, a method of fixing by holding an end with an adhesive tape or the like, and a method of fixing by air suction are known.

Recently, in the exposing apparatus stated above, to reduce exposure time has been demanded.

As a result of studying to reduce exposure time by making the rotational speed of the drum higher, it has been found that image unevenness tends to happen in the method of fixing an end of the sheet-shaped light sensitive material as the conventional technique.

Especially, in the case that the sheet-shaped light sensitive material is a silver halide photographic light sensitive paper, a part of the central portion of the silver halide photographic light sensitive paper sometimes floats up and the floating section shifts out of the depth of field of a light beam, because the stiffness of the silver halide photographic light-sensitive paper is low, differing from a photographic film.

Further, in the case that a paper size is greater than A3 size, since a region distant from the ends is wider, a part of the region tends to float up to an extent that the floating section shifts out of the depth of field of a light beam.

Furthermore, when producing a color proof, if the image unevenness as that stated above takes place, there may be a problem that the reliability as a color proof is lowered.

SUMMARY OF THE INVENTION

The invention has been achieved in view of the aforesaid points, and its object is to obtain an image of high quality on the drum rotating at a high speed.

In addition, the object is to obtain a reliable color proof.

Further, the object is to easily eliminate a light sensitive material falling from the drum in an unlikely event when the drum is rotated at high speed, and to prevent members located in the vicinity of the drum from being damaged by the falling light sensitive material.

Furthermore, the object is to conduct a maintenance work safely such as an eliminating work for a jamming light sensitive material.

The object of the present invention can be attained by the following structure.

An exposing apparatus comprises:
- a drum to fixedly hold a sheet-shaped light sensitive material onto an outer peripheral surface thereof by suctioning;
- a rotating driving means capable of rotating the drum at a rotational speed not less than 1200 rpm; and
- an exposing means for exposing on the basis of image data the light sensitive material fixedly held on the outer peripheral surface of the drum rotated by the rotating driving means.

The object of the invention can be also attained by the following structures corresponding to preferable embodiments shown below.

(Structure 1) An exposing apparatus comprising a drum which holds fixedly, on its outer circumferential surface, a sheet-shaped silver halide photographic light-sensitive paper through air suction, a rotating driving means which rotates the drum, and an exposing means which exposes the sheet-shaped silver halide photographic light-sensitive paper held fixedly through air suction on the drum rotated by the rotating driving means with a light beam, wherein the exposing means can expose, with the light beam, the sheet-shaped silver halide photographic light-sensitive paper held fixedly through air suction on the drum rotated at the speed of 1200 rpm or more by the rotating driving means.

(Structure 2) The exposing apparatus according to Structure 1, wherein the exposing means can expose, with the light beam, the sheet-shaped silver halide photographic light-sensitive paper held fixedly through air suction on the drum rotated at the speed of 1200 rpm or more by the rotating driving means, even when the sheet-shaped silver halide photographic light-sensitive paper is greater than A3 size.

(Structure 3) The exposing apparatus according to Structure 1 or Structure 2, wherein plural holes for air suction are provided on the drum and there is provided a pump for air suction through the holes for air suction.

(Structure 4) The exposing apparatus according to either one of Structure 1 through Structure 3, wherein the exposing means has an optical head which emits plural beams for irradiating the sheet-shaped silver halide photographic light-sensitive paper and a moving means which moves the optical head in the direction along the axis of the drum.

(Structure 5) The exposing apparatus according to either one of Structure 1 through Structure 4, wherein the sheet-shaped silver halide photographic light-sensitive paper is a color photographic light-sensitive material, the exposing means is means for exposing with light beam of plural different wavelengths, the half tone dot image data are those obtained from image data for electronic plate-making, and a color proof corresponding to the image data for electronic plate-making is produced when the exposed sheet-shaped silver halide photographic light-sensitive paper is developed.

(Structure 6) An image forming apparatus having therein a cylinder which has an outer circumferential surface that is substantially a shape of columnar surface for holding fixedly a recording paper, a cylinder rotating means to rotate the cylinder with a column axis of the columnar surface serving substantially as a center, and an exposure head which exposes the recording paper by irradiating it with recording light, and forming an image on an image recording surface of the recording paper held fixedly on the cylinder by irradiating the recording light from the exposure head, wherein a cover which covers surroundings of the cylinder and is provided with a recording light emergent opening and a material ejecting opening is provided, and a clearance in the specific direction between the cover and the cylinder is made to be broader to form a shelter for the jammed recording paper.

In the invention of Structure 6, a clearance in the specific direction between the cover and the cylinder is made to be broader, and thereby, the recording paper which has come off the cylinder due to the high speed rotation, for example, can stay there, thus, even when the recording paper comes off the cylinder, a user can remove it easily and safely, and productivity of the recording apparatus can be improved.

(Structure 7) An image forming apparatus for conveying a recording paper loaded in a recording paper loading section to an image forming section, and thereby for forming an image, wherein there are provided a conveying means which conveys a recording paper along a conveyance path from the recording paper loading section to the image forming section, a shielding means which covers a processing window section representing a part of the conveyance path opened and can be opened and closed, and a locking means which prohibits an operation to open the shielding means while the conveyance means is operating.

In this image forming apparatus, prohibition for opening of the shielding means is released after the operation of the conveyance means is completely stopped, and therefore, when the recording paper needs to be removed, it can be removed easily, thus, it is possible to enhance safety and to prevent damage on movable mechanism of the image forming apparatus.

In the invention, an color proof image corresponding to color separated halftone original image data is a color proof image with which the printed matter produced from the color separated halftone original image data is simulated. Further, image data corresponding to color separated halftone original image data have only to be image data corresponding to color separated halftone original image data, and in addition to color separated halftone original image data, they can also be continuous tone original image data inputted in a processing apparatus to produce a half tone dot image which produces color separated halftone original image data from continuous tone original image data, for example, or continuous tone image data obtained by converting from color separated halftone original image data on a processing apparatus for continuous tone which converts color separated halftone original image data into continuous tone image data.

BRIEF DESCRIPTION OF THE DRAWINGS

FIGS. 14(*b*) and 15(*b*) each is a schematic sectional showing an enclosing member provided on a upper section at the outside of the cover.

DETAILED DESCRIPTION OF THE PREFERRED EMBODIMENT

Hereinafter, one example of an embodiment of the invention will be explained as follows. Incidentally, the invention is not limited to this embodiment.

Figure 1:
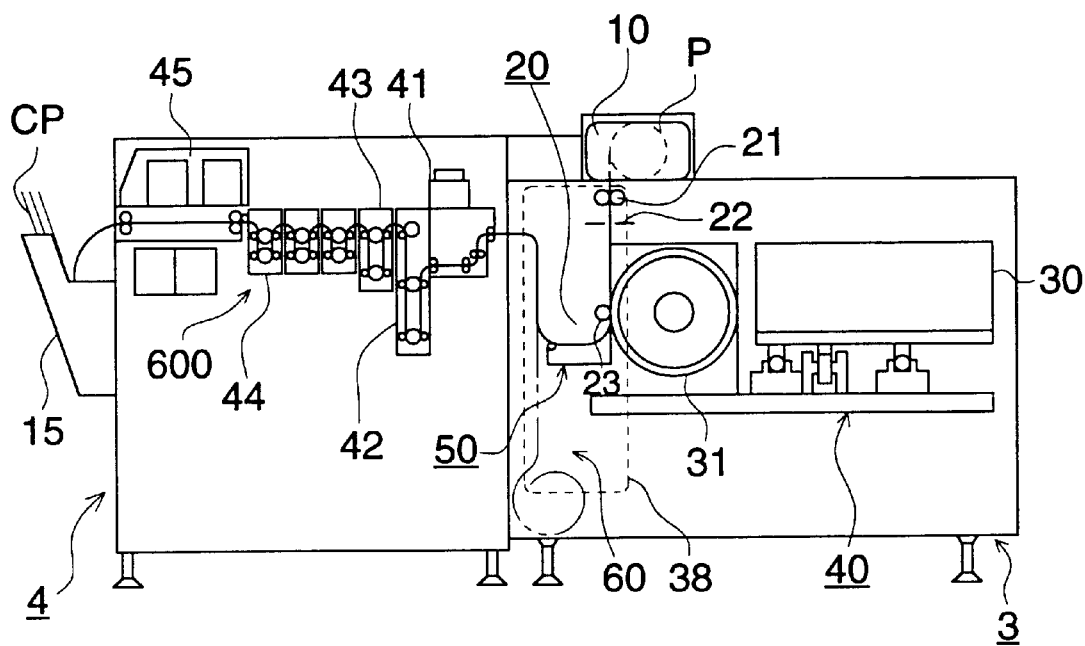
FIG. 1 is a schematic view showing an outlined structure of an image forming apparatus.
Figure 2:
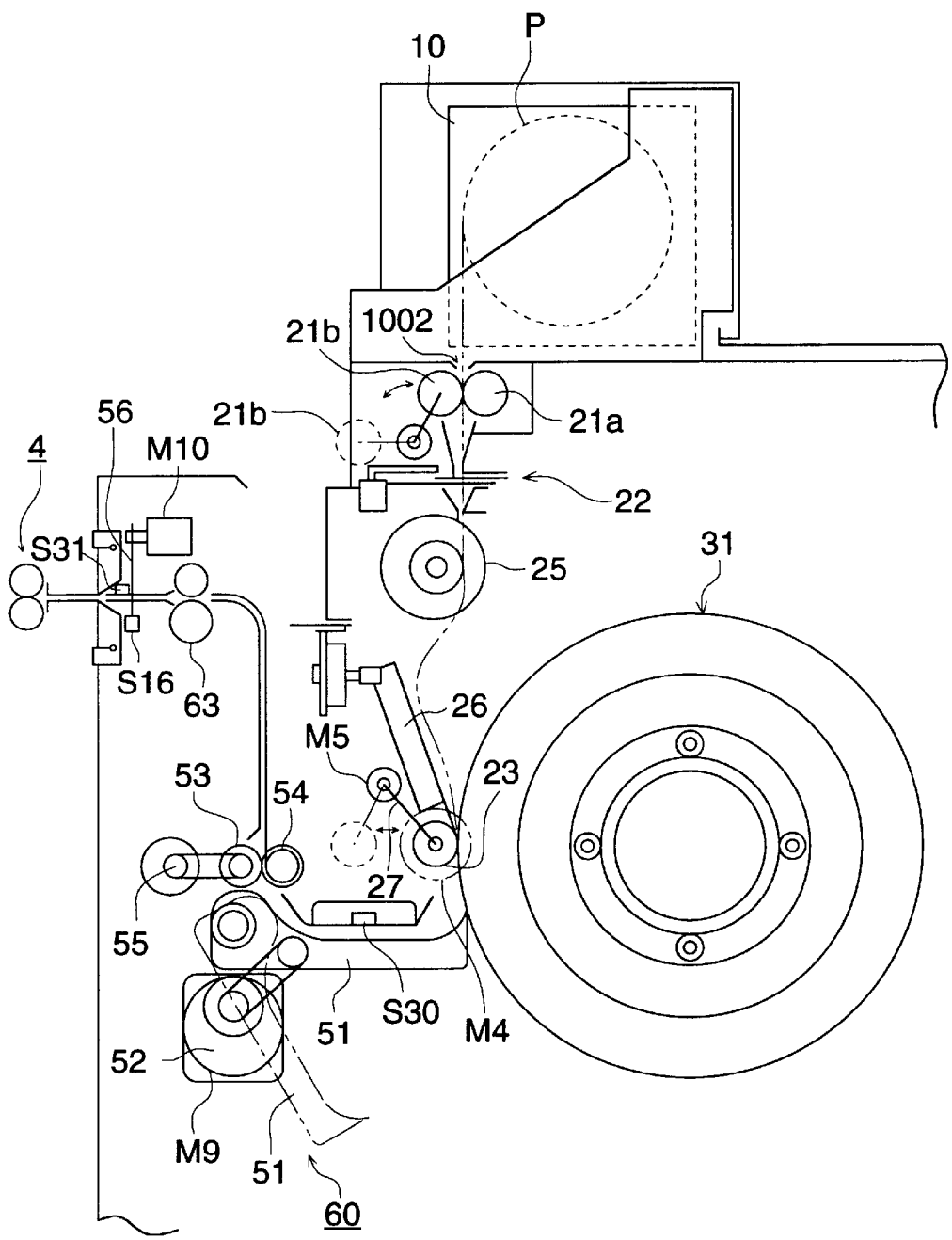
FIG. 2 is a side view showing a setting section and a paper feeding section.
Figure 3:
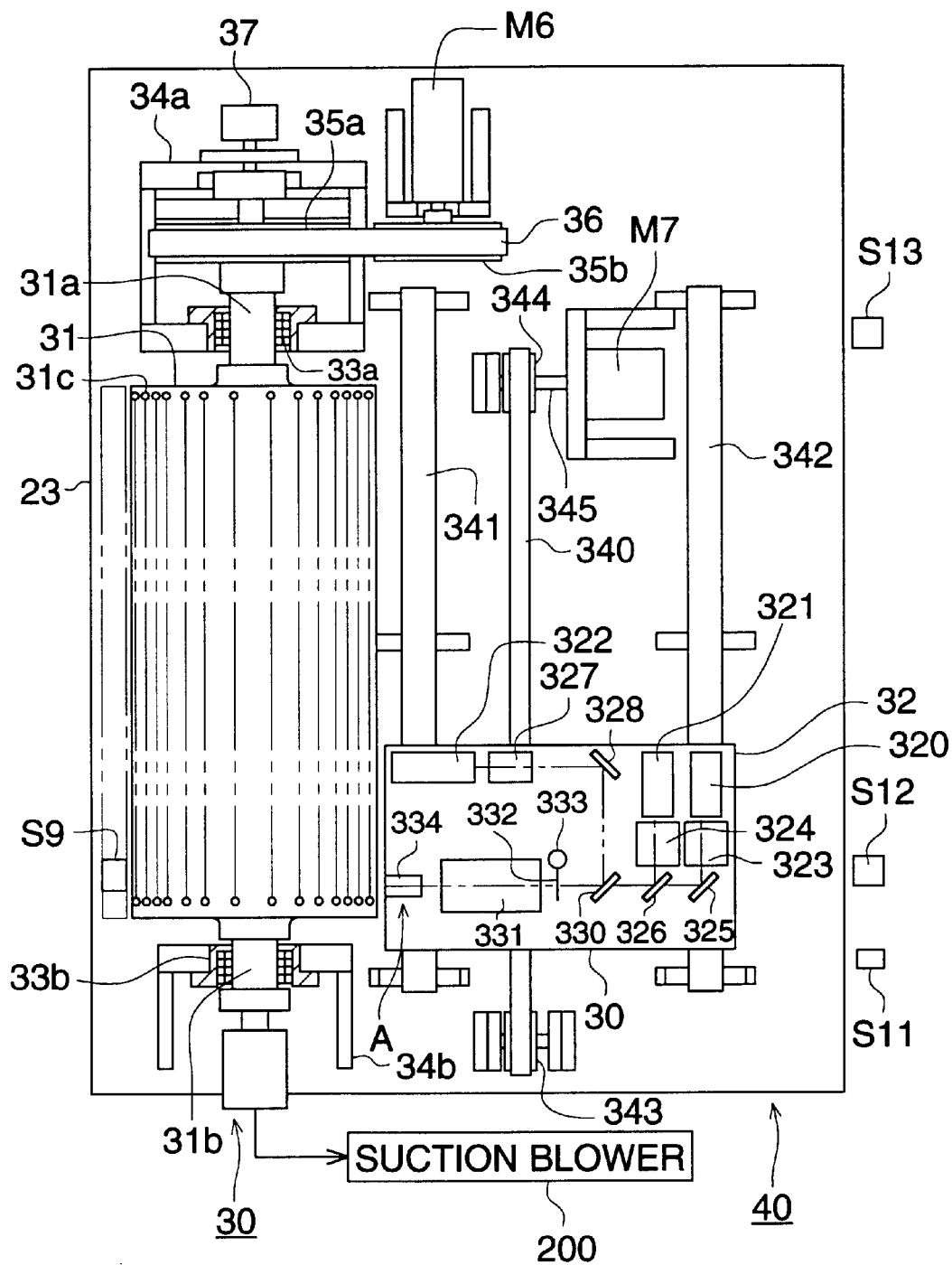
FIG. 3 is a plane view showing a main scanning section and a sub-scanning section.

Firstly, with reference to FIGS. 1, 2 and 3, an exposing apparatus according to the present embodiment is explained.

FIG. 1 is a outlined structural view showing an embodiment of the exposing apparatus according to the present invention and a developing apparatus serially provided to the exposing apparatus.

FIG. 2 is a schematic view showing a primary section of the exposing apparatus and FIG. 3 is a plane view showing the primary section of the exposing apparatus.

The exposing apparatus 3 in the present embodiment uses a silver halide color photographic light sensitive paper P (hereinafter, abbreviated as paper) and exposes the paper P with three light beams different in wavelength on the basis of halftone dot image data obtained from image data used for an electronic plate making process. Thereafter, the paper is subjected to a developing process in a developing apparatus serially provided to the exposing apparatus 3. Whereby a color proof CP recording a color proof image corresponding to the image data used for the electronic plate making process is obtained.

Though image data for electronic plate making are converted into half tone dot image data by RIP 2000 provided outside the present exposing apparatus 3 and are inputted in the exposing apparatus 3 in the present embodiment, the conversion may also be conducted by an image processing means in the exposing apparatus 3.

The exposing apparatus 3 has therein paper cartridge 10 which houses web-shaped paper P on which images are not recorded, optical unit 32 which irradiates ten beams for each of green, red and infrared colors each being of a different wavelength on a paper, sub-scanning section 40 which moves the optical unit 32 in the direction of a rotation axis of drum 31, and drum 31 around which the paper P is wound to be rotated in the course of image recording.

The drum 31 is formed with a hollow body which is made of aluminum, and it is structured to have a large number of suction holes 31c each passing through from the outer circumferential surface of the drum 31 to the inside thereof. Therefore, the inside of the drum is decompressed by operations of suction blower 200, and light sensitive paper P can be sucked and held on the surface of the drum accordingly. Each of shaft sections 31a and 31b of the drum 31 is made of stainless steel and is united solidly with the aluminum hollow body through shrinkage fitting.

Though a diameter of the drum 31 is 29 cm in the unit in the present embodiment, it is preferable that the diameter is 10 cm or more without being limited to 29 cm, from the viewpoints of usefulness and curl of a color proof and of exposure accuracy, and it is preferable to be 1 m or less (in particular, 50 cm or less, and further, 40 cm or less) from the viewpoints of the unit cost and a unit size and of production aptitude and less adverse effect of thermal expansion for obtaining necessary exposure accuracy.

Though a width of the drum 31 (a length of the outer circumferential surface of the drum capable of holding light sensitive paper P in the direction of a rotation axis) is about 60 cm in the unit in the present embodiment, it is preferable that the width is 30 cm or more (in particular, 50 cm or more) without being limited to 60 cm, from the viewpoint of usefulness of a color proof to be made, and it is preferable to be 2 m or less (in particular, 1.5 m or less, further, 1 m or less) from the viewpoints of the unit cost and a unit size and of production aptitude for obtaining necessary exposure accuracy. Due to this, low cost can be attained because no special mechanical strength is required, and the unit can be installed in the highly convenient location because the machine is not so heavy and its installation place is not limited in particular.

A paper width of light sensitive paper P to be exposed (a length of light sensitive paper P in the direction of the rotation axis of drum 31) and a paper length (a length of light sensitive paper P in the rotation direction of drum 31) correspond to sizes of 57 cm×65 cm, 57 cm×70 cm and 57 cm×85 cm in the unit of the present embodiment.

However, it is preferable that the maximum of the paper width of light sensitive paper P to be exposed is 2 m or less (in particular, 1.5 m or less) without being limited to the foregoing, from the viewpoints of unit cost, a unit size and of production aptitude to obtain necessary exposure accuracy. Due to this, the size in the direction of a drum shaft can be small, and weight for obtaining necessary structural accuracy and strength for the drum itself, a drum mounting portion and an optical scanning section can be small to the extent which makes it unnecessary to select the location for installation. Further, the minimum paper width is preferably 25 cm or more (in particular, 50 cm or more) from the viewpoint of usefulness of a color proof to be made.

It is further preferable that the maximum of a paper length of light sensitive paper P to be exposed is 2.5 m or less (in particular, 2 m or less, further, 1.5 m or less) from the viewpoints of the unit cost and a unit size and of production aptitude for obtaining necessary exposure accuracy. Due to this, the size in the radial direction of a drum can be small, an influence of thermal expansion of the drum is small, machining accuracy can easily be obtained, and weight for obtaining necessary structural accuracy and strength can be small to the extent which makes it unnecessary to select the location for installation. Further, the minimum paper width is preferably 25 cm or more from the viewpoint of usefulness of a color proof to be made.

A paper size of light sensitive paper P to be exposed is preferably 0.06 $m^2$ or more (in particular, 0.12 $m^2$ or more) from the viewpoint of usefulness of a color proof to be made. It is further preferable to be 3 $m^2$ or less (in particular, 2 $m^2$ or less), and due to this, the size in the unit can be small, and weight for obtaining structural strength can be small to the extent which makes it unnecessary to select the location for installation.

From a viewpoint of control of variations in resolution, sharpness and density of an image to be exposed, it is preferable that eccentricity of drum 31 is 100 $\mu$m or less (in particular, 50 $\mu$m or less), and due to this, eccentric rotation can be restrained and high speed rotation is made possible, and even highly detailed exposure can be made to be within the depth of focus, and thereby to be realized. It is further preferable that eccentricity of drum 31 is not more than the depth of focus for light irradiated on light sensitive paper P held on the drum 31 which will be explained later. The eccentricity of drum 31 in the unit of the present embodiment is about 5 $\mu$m which is about one sixth of the depth of focus 30 $\mu$m of light irradiated on light sensitive paper P held on the drum 31.

Without being limited to the foregoing, it is preferable that coefficient of linear expansion R(/K) of the drum 31 satisfies the following expression together with diameter D cm of the drum, from a viewpoint of control of variations in resolution, sharpness and density of an image to be exposed which are caused by temperature changes.

$R \times D \leq 0.01$

It is especially preferable that the following expression is satisfied.

$R \times D \leq 0.001$

The drum 31 in the unit of the present embodiment is made of aluminum, and its coefficient of linear expansion is about 0.00002 (/K), its diameter is about 29 cm, and R×D is about 0.0006 (cm/K).

On this embodiment, a thickness of a substrate of the paper P used for producing a color proof is about 100 $\mu$m. However, the thickness is not limited to this figure.

In order to conduct air suction through a large number of suction holes 31c provided on the peripheral surface of the drum 31 so as to reduce the pressure inside the drum, a suction blower 200 is connected through an air duct to the drum 31.

The suction holes are provided densely (with high density) at the section (region) corresponding to the four sides of the used paper P on the peripheral surface of the drum 31. In comparison with the sections corresponding to the four sides, the suction holes are provided coarsely (with low density) at the section corresponding to the center of the paper P.

Further, the air suction operation of the suction blower 200 is controlled by a control section 100.

Optical unit 32 has therein green laser light source (LD) 320, red laser light source (LD) 321, and infrared laser light source (LD) 322. To be concrete, each light source of the green laser light source (LD) 320, red laser light source (LD) 321, and infrared laser light source (LD) 322 generates each of laser beams which are respectively for three wavelengths of green G, red R and infrared IR, so that a cyan color forming layer (C layer), a magenta color forming layer (M layer) and a yellow color forming layer (Y layer) of light sensitive paper P may be sensitized respectively. In other words, the light sensitive paper P is one wherein B light-sensitive layer is sensitive to infrared light, and a light source for the light sensitive paper P is shifted to infrared. The green laser light source 320, red laser light source 321, and infrared laser light source 322 are arranged to be modulated in terms of a quantity of light through direct modulation corresponding to modulation signals.

Figure 4:
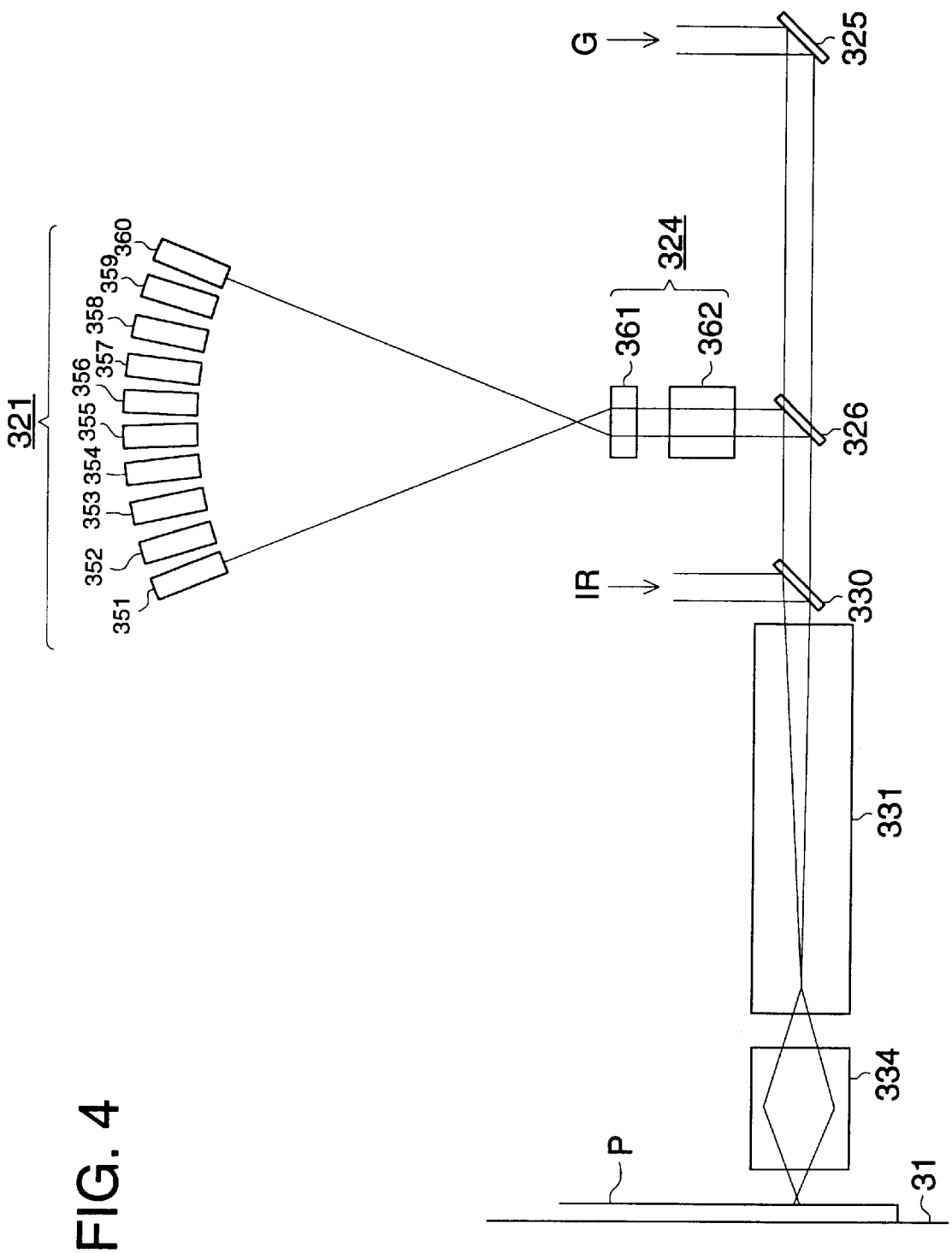
FIG. 4 is a schematic view showing an arrangement of an exposing optical system.

An optical system of optical section 32 will be explained based on FIG. 4 in which a part of the optical system of the optical section 32 is shown.

On the red laser light source (LD) 321, there are provided ten red laser diodes 351–360 so that their light emitting surfaces may form a circular arc. Each of the red laser diodes 351–360 emits a laser beam which has been modulated in terms of a quantity of light in accordance with image signals. The emitted laser beam enters incident optical system 324 equipped with lens 361 and cylindrical lens group 362 which is composed of two cylindrical lenses, then the lens 361 makes ten beams to be in parallel with each other, and the cylindrical lens group 362 respectively adjusts beam shapes of the ten beams which have been made by the lens 361 to be in parallel, and makes the ten beams to emerge to dichroic reflecting mirror 326. Namely, since a beam shape of a laser beam emitted from a semiconductor laser (LD) is elliptic, the beam shape of the laser beam is adjusted to complete round by the cylindrical lens group 362.

On the green laser light source 320 and infrared laser light source 322, there are respectively provided incident optical systems 323 and 327. Ten green laser beams and ten infrared laser beams emitted respectively from the incident optical systems 323 and 327 are reflected respectively on reflecting mirrors 325 and 328.

Dichroic reflecting mirror 326 is a mirror which transmits green light and reflects red light, and it transmits ten green laser beams reflected on reflecting mirror 325 and reflects ten red laser beams emerging from incident optical system 324, to guide them to dichroic reflecting mirror 330.

Dichroic reflecting mirror 330 is a mirror which transmits green light and red light and reflects infrared light, and it transmits ten green laser beams and ten red laser beams both coming from the dichroic reflecting mirror 326, and reflects ten infrared laser beams reflected on reflecting mirror 328 and emerging from incident optical system 327, to guide them to reduction optical system 331.

The reduction optical system 331 reduces beam intervals of each ten green laser beams, red laser beams and infrared laser beams, and guides them to image forming lens 334 which then makes each ten green laser beams, red laser beams and infrared laser beams which have been reduced by the reduction optical system 331 in terms of beam intervals and have been enlarged in terms of beam diameter to form images on a photosensitive surface of a light sensitive paper which is in close contact with the outer circumferential surface of the drum 31.

By using the image forming lens 334, it is possible to restrain a change in a diameter of a laser beam to which light sensitive paper P is exposed, even when a distance between the image forming lens 334 and a light-sensitive surface of light sensitive paper P is varied by eccentric movement of the drum 31.

From a viewpoint of securing stable strength for exposure, stable exposure position and stable sharpness despite positional variation of the drum 31 and optical section 32, it is preferable that the depth of focus of the image forming lens 334 is not less than ±10 $\mu$m, under the definition that variation of a beam diameter is a depth within ±50%. Incidentally, on the unit in the present embodiment, the depth of focus is ±30 $\mu$m.

The image forming lens 334 collectively reduces laser beams for each wavelength uniformed to be of the same beam intervals simultaneously, and makes each laser beam to be projected on a light-sensitive surface of light sensitive paper P as a collimated beam.

Figure 5:
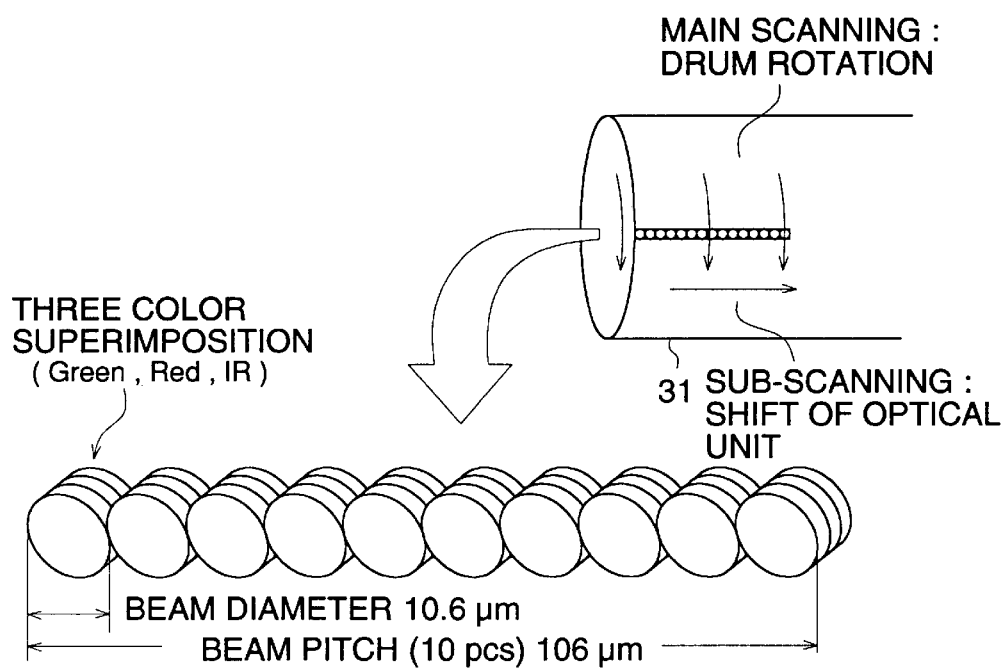
FIG. 5 is a view explaining an arrangement and a shape of laser beams for each wavelength projected on a light sensitive surface of a light sensitive material.

An arrangement and a form showing a laser beam for each wavelength projected on a light-sensitive surface of light sensitive paper P will be explained, referring to FIG. 5. Ten laser beams for each of laser beams for three wavelengths are projected on a light-sensitive surface of light sensitive paper P.

When a channel is defined to be one wherein light projected on a different position from others on light sensitive paper P is used to control light emission independently, the unit in the present embodiment has ten channels for each wavelength, because ten laser diodes which are controlled independently in terms of light emission are provided for each of three wavelengths of green, red and infrared in the unit of the present embodiment, and laser beams emitted from the 10 laser diodes are projected on different positions on the light sensitive paper P.

Figure 6:
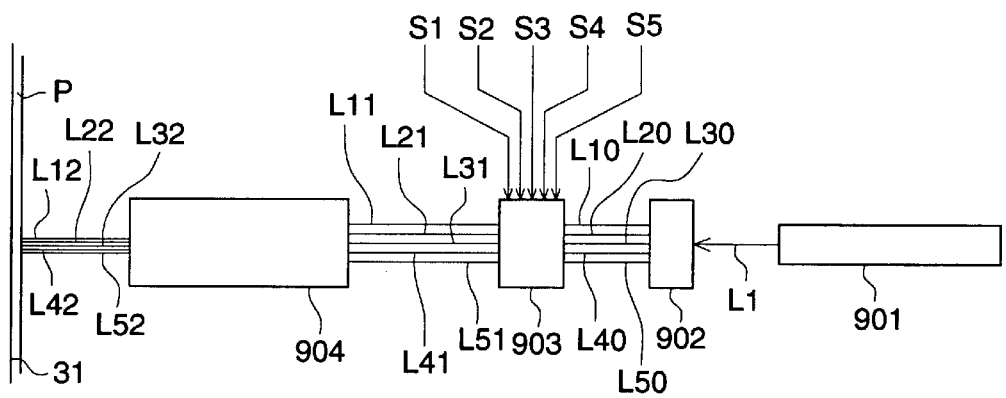
FIG. 6 is a side view showing a modified example of the exposing optical system.

A concept of the channel will further be explained based on a variation of an exposure optical system of the present embodiment. The first variation is an exposure optical system having therein gas laser 901 such as He—Ne laser which emits a line of laser beam L1, beam splitter 902 which splits laser beam L1 emitted by the gas laser 901 into five laser beams L10, L20, L30, L40 and L50, optical modulation element 903 such as an acoustic-optical element which adjusts intensity of each of five laser beams L10, L20, L30, L40 and L50 split by the laser beam splitter 902 with each of corresponding input signals S1, S2, S3, S4 and S5 and emits intensity-adjusted laser beams L11, L21, L31, L41 and L51, and lens optical system 904 which makes the intensity-adjusted laser beams L11, L21, L31, L41 and L51 to be reduced and to form images on light sensitive paper P held on drum 31, as shown in FIG. 6. In this first variation, five laser beams each being controlled independently in terms of light emission are projected on different positions on light sensitive paper P, which represents five channels.

Figure 7:
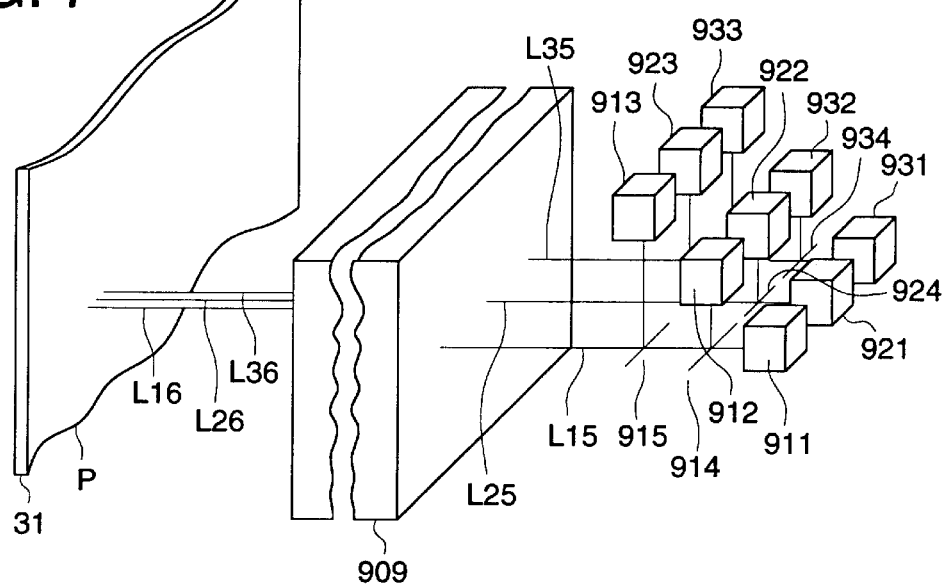
FIG. 7 is a perspective view showing the modified example of the exposing optical system.
Figure 8:
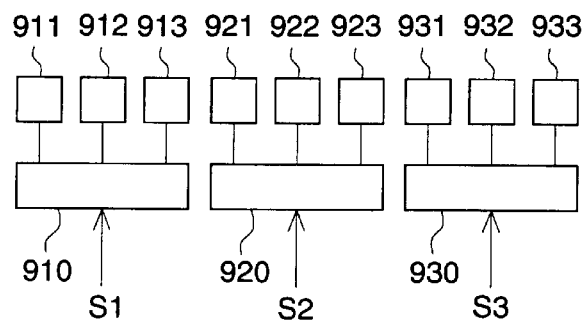
FIG. 8 is a block diagram showing a light emission control section of the exposing optical system. an image forming apparatus.

The second variation is an exposure optical system having therein laser diodes 911, 912, 913, 921, 922, 923, 931, 932 and 933 each emitting a line of a laser beam, half mirrors 914 and 915 for mixing laser beams emitted from laser diodes 911, 912 and 913, half mirrors 924 and 925 for mixing laser beams emitted from laser diodes 921, 922 and 923, half mirrors 934 and 935 for mixing laser beams emitted from laser diodes 931, 932 and 933, lens optical system 909 which makes the mixed three laser beams L15, L25 and L35 to be reduced and to form images on light sensitive paper P held on drum 31, first light emission control section 910 which controls light emission of laser diodes 911, 912 and 913 with input signal S1 second light emission control section 920 which controls light emission of laser diodes 921, 922 and 923 with input signal S2, and third light emission control section 930 which controls light emission of laser diodes 931, 932 and 933 with input signal S3, as shown in FIGS. 7 and 8. In this second variation, three laser beams each being controlled independently in terms of light emission are projected on different positions on light sensitive paper P, which represents three channels.

However, the number of channels is preferably two channels or more (five channels or more in particular) without being limited to the foregoing, from a viewpoint of image recording speed (exposure speed), and it is preferably ten channels or less (40 channels or less in particular, and more preferably 32 channels or less) from viewpoints of production cost, easy adjustment, simplicity, easy production, simplicity of exposure control and stability.

The number of wavelengths is preferably three or more without being limited to three in the unit of the present embodiment, from a viewpoint of making a color proof, and it is preferably ten or less (four or less in particular) from viewpoints of cost of a unit and simplicity of control, even if specific features are taken into consideration. When the number of wavelengths is four, it is especially preferable that they correspond to Y-, M-, C- and black-printing plate.

In the unit of the present embodiment, the number of light sources per one channel for each wavelength is one. However, without being limited to this, it is possible to employ one wherein plural channels share one light source such as the one wherein a beam from one light source is split by a beam splitter into plural beams and each beam is controlled. Or, on the contrary, it may also be one wherein one channel has plural light sources such as the one wherein one channel is irradiated by light from plural LEDs. However, from viewpoints of simplicity of a spectral optical system, exposure speed and easiness of exposure control, it is preferable that the number of light sources per channel for each wavelength is 0.01 or more (in particular, 0.1 or more), and from viewpoints of simplicity of a spectral optical system and easy production, the number of light sources per channel for each wavelength is 100 or less (in particular, 10 or less).

In the unit of the present embodiment, beam centers for three wavelengths almost agree in terms of position. In this case, it is preferable that an amount of deviation of beam centers for different wavelengths is not more than 0.2 times the distance between beam centers of adjoining channels, and it is especially preferable that the amount of deviation is not more than 0.1 times, for better image recording.

It is preferable that the distance between centers of irradiating beams of adjoining channels is 1 $\mu$m or more (in particular, 5 $\mu$m or more) on a light sensitive paper. Due to this, it is possible to prevent high accuracy which exceeds resolution limit of an image and is higher than necessary, to make the optical system, the mechanism system and driving circuits to be of low cost, and to record images at high speed with simple structures. It is also preferable to be 1 mm or less (in particular, more preferable 100 $\mu$m or less, further, much more preferable 20 $\mu$m or less). Due to this, image recording at high speed in high accuracy is made to be possible. Incidentally, in the unit of the present embodiment, laser beams for each wavelength are arranged to be in parallel with a rotation axis of drum 31, and the distance between centers of the beams is 10.6 $\mu$m.

It is preferable that coefficient of linear expansion R2 (/K) of the base board of optical section 32 satisfies the following expression together with size of an optical base board (a distance from a corner to a corner which is longest among the combination of corners) L cm.

R2×L≦0.01

It is especially preferable to satisfy the following expression.

R2×L≦0.001

Due to the foregoing, it is possible to restrain that resolution and sharpness of images to be exposed are deteriorated by temperature changes and an amount of exposure is varied.

In the unit of the present embodiment, a base board of optical section 32 is made of aluminum, and the coefficient of thermal expansion of the base board of optical section 32 is about 0.0002 (/K) and a size of the optical base board (a distance from a corner to a corner which is longest among the combination of all corners) is about 40 cm, but R2×L is about 0.0008 (cm/K).

Further, it is preferable that the maximum power consumption of each light source such as a laser diode is not more than 10 W or less (in particular, 3 W or less, further 1 W or less). Due to this, it is easy to lower the maximum power consumption with a smaller amount of heat generation, and it is easy to make a temperature of the laser diode to be constant, and to make a wavelength for light emission and an amount of light emission to be constant. Further, since an amount of heat generation is small, it is possible to restrain fluctuations of those including a position of irradiation onto a light sensitive paper, an amount of irradiated light, a beam shape and a position of a focus, all caused by a change in a placement relation of each optical element which is further caused by heat generation of the light source. It is further possible to restrain blurred images and variation of an amount of exposure, and to restrain variations of wavelengths for light emission and intensities of light emission caused which are brought about by temperature change that is caused when a light source is a diode. Further, the maximum power consumption of 10 $\mu$W or more (in particular, 20 $\mu$W or more) is preferable. Due to this, a sufficient amount of exposure can be obtained. It is 100 mW in the unit of the present embodiment.

A rated quantity of light of each light source such as a diode preferably is 150 mW or less (in particular, 50 mW or less, further, 5 mW or less). Due to this, the maximum power consumption can be made small. When it is 50 mW or less, in particular, the safety is high, which is preferable. Further, the rated quantity of light of 1 $\mu$W or more (in particular, 0.5 mW or more) is preferable. Due to this, a quantity of light used for exposure of a light sensitive paper can easily be made sufficient. It is 3 mW in the unit of the present embodiment.

Driving frequency (MHz) of each light source such as a laser diode preferably is 0.5 MHz or more (in particular, 1 MHz or more) from a viewpoint of exposure speed, and it preferably is 100 MHz or less (in particular, 50 MHz or less, further 20 MHz or less) from viewpoints of stability of exposure driving circuits, stability of an amount of exposure and of a position of exposure related to heat generation, and cost of a circuit. It is 2.8 MHz in the unit of the present embodiment.

It is further preferable that the number of pixels recorded per one second by drum 31 and optical section 32 is 3,000,000 pixels /sec or more (in particular, 10,000,000 pixels/sec or more). Due to this, image recording at high speed and highly detailed image recording can be compatible. The number of recorded dots of 4 billions pixels or less (in particular, 0.5 billions pixels or less) is preferable. Due to this, driving circuits are stabilized, image recording is stabilized, and exposure intensity and exposure position are stabilized, with low cost and easy adjustment. The number of recorded dots in the unit of the present embodiment is about 30,000,000 pixels/sec.

Incidentally, a shutter 332 is a light shielding member to prevent the light beams from entering into the paper during a period except the exposing operation.

A sub-scanning section 40 shifts the optical unit 32 in the sub-scanning direction which is a direction parallel to the rotation axis of the drum 31. The sub-scanning section 40 comprises a sub-scanning motor M7 used as a driving source, a pulley 344 provided to the shaft of the sub-scanning motor M7, a rotation belt to which the optical unit 32 is fixed, a pulley to support the rotation belt 340 with the pulley 344, guide rails 341 and 342 to guide the optical head 103 in the sub-scanning direction, a home position detecting sensor S11 to detect the home position of the optical unit 32, and a writing starting position detecting sensor S12 to detect the writing starting position of the optical unit 32.

The sub-scanning motor M7 drives the optical unit 32 so as to return to the home position, and then shifts the optical unit in the sub-scanning direction. When the writing starting position detecting sensor S12 detects the writing starting position, the optical unit 32 starts exposing to the paper P held on the drum 31.

Figure 9:
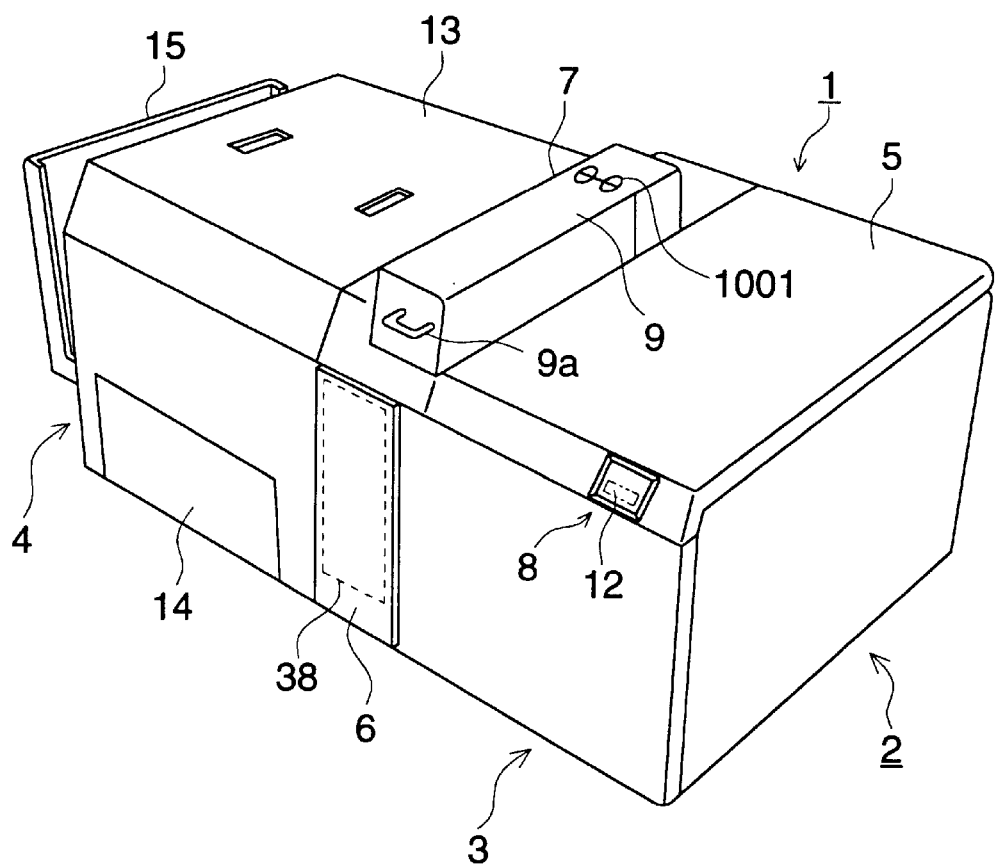
FIG. 9 is a perspective view of an image forming apparatus.
Figure 10:
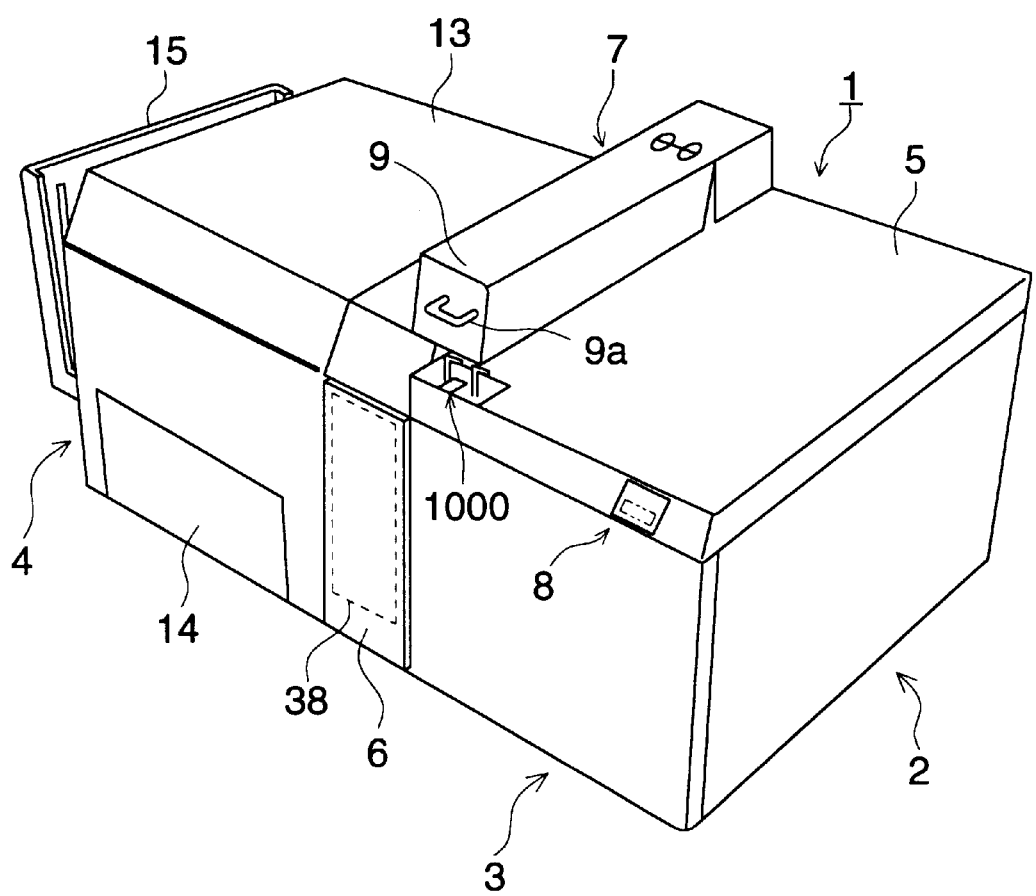
FIG. 10 is a perspective view of an image forming apparatus on which an opening/closing cover is opened.

FIG. 9 is a perspective view of an image forming apparatus 1 in the present embodiment, and FIG. 10 is a perspective view of the image forming apparatus 1 wherein a cover for shielding light to a recording paper is opened.

On apparatus main body 2 of the image forming apparatus 1 in the present embodiment, there are provided exposing apparatus 3 and processing apparatus 4. The exposing apparatus 3 is provided in a way that upper panel 5 and front panel 6 can be closed and opened, so that maintenance work may be carried out through the top side and front side of the apparatus. On the upper portion of the exposing apparatus 3, there is arranged setting section 7 on the developing section side, and there is arranged operation section 8 on the right side on the upper portion.

When front panel 6 is opened, jam clearance window section 38 appears. It is possible to remove a paper which stays in the conveyance path because of conveyance failure, by inserting a hand in image forming apparatus 1 through the jam clearance window section 38. The front panel 6 covers the jam clearance window section 38 during operations (driving) of the apparatus so that a person may not insert its hand into image forming apparatus and an object may not enter.

On the setting section 7, there is provided recording-material-shielding cover 9 in a way that it can be opened and closed, and handle 9a is provided on the recording-material-shielding cover 9. It is so arranged that an operator can open the recording-material-shielding cover 9 in the direction from this side to the back side of apparatus main body 2 by holding the handle 9a and can close it, and recording-material-container 10 housing therein a roll-shaped recording paper (hereinafter referred to as a light-sensitive material, or paper) can be set by the recording-material-shielding cover 9, while being guided by recording-material-container guide 1000.

On the operation section 8, there are provided liquid crystal panel 11 and touch panel 12. On the processing apparatus 4, there are provided top panel 13 and supply panel 14 to be capable of being opened and closed, and maintenance work is carried out through the top side, while processing solutions are replenished through the front side. On the side of the processing apparatus 4, there is provided paper exit section 15 onto which the finished light-sensitive material is ejected.

In FIG. 1, the exposing apparatus 3 is equipped with paper supply section 20, main scanning section 30, sub-scanning section 40 and accumulator section 60. The paper supply section 20 is equipped with paired conveyance rollers 21, cutter section 22 and drum supply/ejection paper drum roller 23. A light-sensitive material is taken out of recording paper container 10 by the paired conveyance rollers 21, then is cut to a prescribed length by the cutter section 22, and is sent to main scanning section 30 through drum paper-supply/ejection roller 23.

The main scanning section 30 and the sub-scanning section 40 constitute exposure section 500 which records an image on a light-sensitive material, and drum 31 constituting a cylinder is rotatably provided on the main scanning section 30, thus, a light-sensitive material is adsorbed on the outer surface of the drum 31 to be rotated solidly with the drum. Optical unit 32 is arranged to face the drum 31, and it is so arranged that the optical unit 32 is moved by sub-scanning section 40 in the direction which is in parallel with the drum shaft. The optical unit 32 makes a light-sensitive material which has received digital image signals and has been adsorbed on the drum 31 to be exposed to a laser beam for image writing.

A ejecting section 50 comprises a means for peeling off the paper from the drum 31 and a means for conveying the paper to the processing apparatus 4.

That is, the ejecting section 50 comprises a peeling guide 51 provided to be rockable so as to come in contact with the drum 31 only at the peeling time in order to peel off the paper held on the drum 31, a peeling rocking mechanism 52 to rock the peeling guide 51, conveying rollers 53 and 54, a conveyance motor 55 to drive the conveying rollers 53 and 54, an exit shutter 56, an accumulating section 60 to accumulate temporarily the paper peeled from the drum 51.

Accumulator section 60 makes a light-sensitive material to stop temporarily, for the purpose to transfer the light-sensitive material to processor section 600 equipped on processing apparatus 4 which processes the light-sensitive material exposed to light by exposure section 500. This accumulator section 60 separates the light-sensitive material on which writing has been finished from the drum 31, and feeds it in the processor section 600. In this case, when the conveyance speed of the processor section 600 is lower than the paper ejection speed of the exposure section 500, the light-sensitive material is fed in the accumulator section 60 at the paper ejection speed as it is so that the light-sensitive material is looped to hang down at the accumulator section 60, thus, conveyance is synchronized in terms of timing with the processor section 600 not to lower the processing capability of the exposure section 500.

On the processing apparatus 4, there are provided second exposure section 41 (which will be described in an example of reversal exposure direct positive light-sensitive material, later), developing section 42, fixing section 43, stabilizing section 44 and drying section 45. A dummy image is formed on a part of a light-sensitive material which is not exposed by the second exposure section 41 in the exposure section 500, while a light-sensitive material subjected to the second exposure is conveyed to the developing section 42, the fixing section 43 and the stabilizing section 44 to be processed, and the light-sensitive material thus processed is dried at the drying section 45 to be ejected out to the paper ejection section 15.

Figure 11:
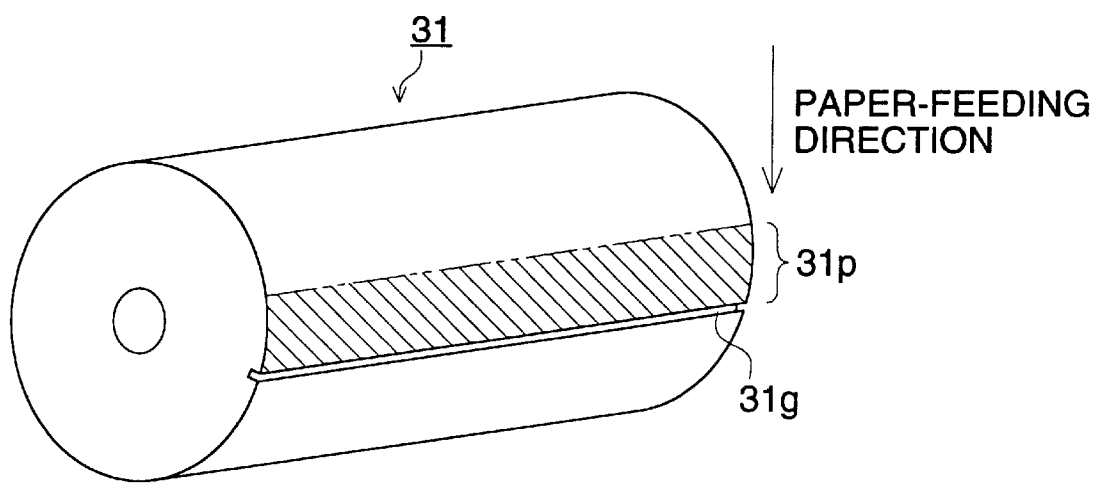
FIG. 11 is a perspective view of a drum.
Figure 12:
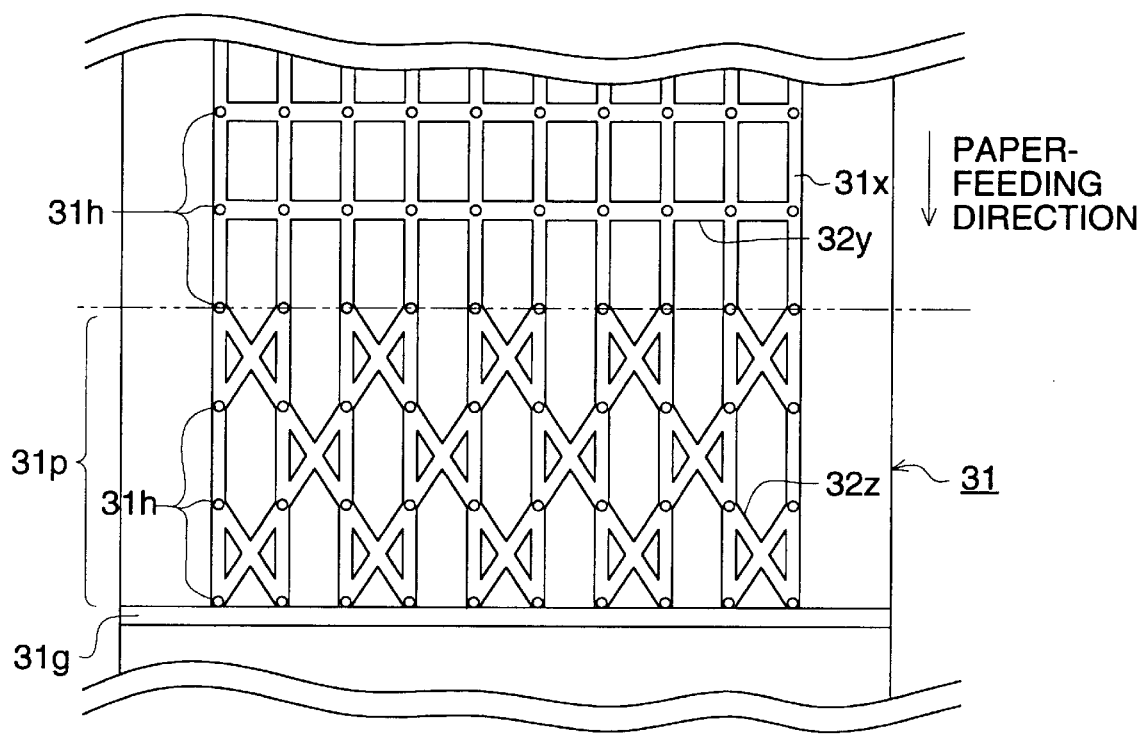
FIG. 12 is a developed view of a peripheral surface of the drum in the first example.

Here, FIGS. 11 and 12 are used to explain the first example of drum 31 of exposing apparatus 3 relating to the present embodiment. FIG. 12 is a development elevation of the drum circumferential surface in the first example.

In the present embodiment, the direction for paper feeding in the case of feeding the paper for winding the paper around the drum 31 is the arrowed direction shown in FIGS. 11 and 12, and it is the direction perpendicular to the direction of rotary axis of the drum.

On the circumferential surface of the drum 31, there is provided one leading edge positioning groove 31g which catches the leading edge of the paper to position it, in the direction perpendicular to the direction of the rotary shaft, namely to the paper-feeding direction.

A large amount of suction holes 31h are provided in a regular pattern on the entire circumferential surface of the drum 31 to stably fix paper P on the circumferential surface of the drum through air suction when winding the paper around the circumferential surface of the drum 31.

In the present embodiment, suction holes 31h are arranged regularly both in the circumferential direction and the rotary shaft direction.

Further, there are provided suction communicating grooves 31x, 31y and 31z each connecting suction hole 31h with suction hole 4 in a communicating basis so that air suction force coming through the suction holes 31h may be uniformly distributed to entire circumferential surface of the drum.

In general, the suction communicating grooves on the circumferential surface of the drum 31 are composed of suction communicating grooves 31x each connecting suction hole 31h with suction hole 31h both in the circumferential direction on the drum 31 on a communicating basis and suction communicating grooves 31y each connecting suction hole 31h with suction hole 31h both in the rotary shaft direction of the drum 31 on a communicating basis.

In the embodiment shown in FIG. 12, however, there is provided, on part 31p of the drum circumferential surface which is touched by the portion in the vicinity of the leading edge of paper P, suction communicating grooves 51z which are inclined to the paper-feeding direction, in place of the suction communicating grooves 31y which are in the rotary shaft direction of the drum 31.

Due to this structure, it is possible to prevent paper-feeding failure which might be caused when the leading edge of a paper is caught by suction communicating grooves 31y which are in the rotary shaft direction when the paper is fed to the drum 31.

Incidentally, it is also possible to provide suction communicating grooves 31z which are inclined to the paper-feeding direction, in addition to those provided on the portion 31p where a paper touches the circumferential surface of drum 31 when the paper is fed, without providing suction communicating grooves 31y in the rotary shaft direction on the entire circumferential surface of drum 31.

Next, the structure of each section of an image forming apparatus will be explained in detail, referring to FIG. 13.

In setting section 7, recording-material-shielding cover 9 is provided on upper panel 5 to be capable of being opened and closed, and recording paper container 10 is loaded under the state wherein the recording-material-shielding cover 9 is opened. The recording-material-shielding cover 9 is closed under the state wherein the recording paper container 10 is loaded, and the recording-material-shielding cover 9 is locked by locking mechanism 71. The locking mechanism 71 is operated by cover-locking motor M1. On the recording-material-shielding cover 9, there is provided recording paper container existence sensor S1, and on setting section 7, there are provided cover open detecting sensor S2 and cover lock detecting sensor S3. Recording paper container 10 is set on the position between rollers 21a and 21b of paired conveyance rollers 21 in conveyance section 20, under the state wherein the tip of the light-sensitive material is drawn out by a prescribed length.

On paper supply section 20, there is provided paper end sensor S4 between rollers 21a and 21b and recording paper container 10, and a trailing edge of a light-sensitive material drawn out of the recording paper container 10 is detected by the paper end sensor S4. A position of roller 21a on one side is fixed, while roller 21b on the other side is arranged to be capable of being moved by roller moving mechanism 24, and paper supply roller 21b is moved to its standby position, except the period of paper conveyance operations, so that occurrence of paper crease may be prevented by rollers in pressure contact, The roller moving mechanism 24 is operated by roller pressure contact releasing motor M2.

During the period of conveying a light-sensitive material, roller 21 is moved to the conveyance position so that the light-sensitive material may be nipped between opposing rollers 21a and 21b. The position of the roller 21b is detected by paper supply roller pressure contact position detecting sensor S5 and by paper supply roller release position detecting sensor S6. The roller 21a is operated by paper supply motor M3.

Cutter section 22 is operated by cutter motor M20. Encoder roller 25 and guide 26 are provided between drum supply/ejection paper roller 23 and the cutter section. The encoder roller 25 feeds a light-sensitive material through its rotation and detects an amount of feeding a light-sensitive material.

The drum supply/ejection paper roller 23 is arranged to be capable of being moved by roller moving mechanism 27 to a pressure contact position and to a release position. The drum supply/ejection paper roller 23 is driven by drum supply/ejection paper motor M4. The position of the drum supply/ejection paper roller 23 is detected by drum supply/ejection paper roller pressure contact position detecting sensor S7 and drum supply/ejection paper roller release position detecting sensor S8. The roller moving mechanism 27 is operated by drum supply/ejection paper roller pressure contact release motor MS.

To carry the paper (a light sensitive material) from the exposing apparatus 3 to processing apparatus 4, the accumulating section 60 is provided at a position beneath the peeling guide 51.

The exit shutter 56 is opened and closed by exit shutter motor M10. The opening and closing of the exit shutter 56 are detected by exit shutter opening detecting sensor S16. The control section 100 determines an ejection timing for the paper, opens the exit shutter 56 at the prescribed timing and sends the paper to the processing apparatus 4. Further, there is provided exit sensor S31 to detect that the paper is sent to the processing apparatus 4.

Figure 13:
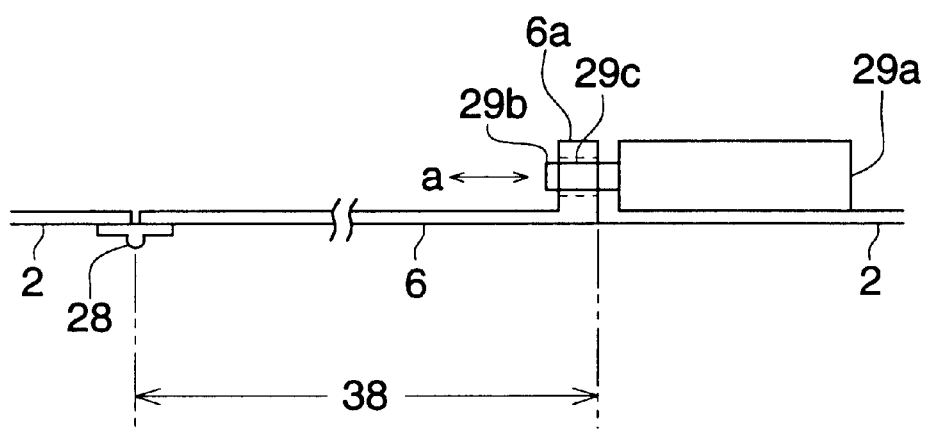
FIG. 13 is a cross sectional view showing a locking mechanism of a front panel.

As shown in FIG. 13, front panel 6 which is a shielding means to cover the conveyance path of a light-sensitive material is mounted on apparatus main body 2 through hinge 28. There is provided vertical section 6a on the front panel 6 at the position that is opposite to the hinge 28, and the vertical section 6a is formed to be vertical toward the inside of the apparatus main body 2. There is formed locking hole 29c on the vertical section 6a.

Inside the apparatus main body 2, there is provided front panel locking solenoid 29a, and when the front panel 6 is closed, movable iron core (plunger) 29b and the locking hole 29c are positioned to be adjacent each other. The movable iron core 29b is of a rod shape and it reciprocates in the longitudinal direction (arrow a) when switching an adsorption position (excitation) and a returned position (non-excitation).

When the movable iron core 29b of the front panel locking solenoid 29a is engaged with the locking hole 29c, the front panel 6 is locked. When the engaged movable iron core 29b retreats from the locking hole 29c, the front panel 6 is released from locking. When the front panel 6 is locked, it enters the state in which it can not be opened ( no opening), and a hand can not be inserted through the jam clearance window section 38. When the locking is released, the front panel 6 enters the state in which it can be opened, and a hand can be inserted through the jam clearance window section 38. Since the jam clearance window section 38 is of a form which allows access to each mechanism along conveyance path 80, namely to paper-feeding section 20 of exposing apparatus 3, first paper ejection section 50, and accumulating section 60, it is possible to remove the paper jammed in the conveyance path 80. Since it is further possible to access from the jam clearance window section 38 to drum 31, it is also possible to remove the paper which is wound around the drum 31 due to peeling jam.

Next, structures of a recording paper light-shielding cover 9, a setting section 7, a feeding section 20 and an exposure section of the image forming apparatus 1 will be explained in detail, referring to FIG. 14(a). FIG. 14(a) is a diagram showing the recording paper light-shielding cover, the setting section, the feeding section and the exposure section.

Recording paper light-shielding cover 9 is capable of being opened in the direction from this side to the back side of apparatus main body 2 and closed, and it is provided on its lower side with light-shielding cover opening section 9b, and is arranged to be capable of being opened and closed around hinge 1001 on the back side serving as a fulcrum.

On the setting section 7, there is formed recording paper insertion inlet 1002 which extends from this side to the back side of apparatus main body 2, and it is so arranged that tip P1 of recording paper P is inserted into the recording paper insertion inlet 1002 with material drawing outlet 10a of recording paper container 10 facing downward, and then the recording paper is pushed from this side to the back side along the light-shielding cover opening section 9b to be loaded.

On the paper-feeding section 20 located at the lower portion of the setting section 7, there are provided paired conveyance rollers 21 which pull out recording paper P loaded in the conveyance direction, and cutter section 22 which cuts the recording paper after the tip P of the recording paper P is drawn out by a prescribed amount.

With regard to the paired conveyance rollers 21, roller 21a facing the inner side of core-set of recording paper P is made of a material having lower frictional resistance and good slidableness, while, roller 21b located to be opposite to the core-set is made of a material having higher frictional resistance, and when loading the recording paper, the roller made of material with higher frictional resistance is moved in the pressure contact releasing direction so that a clearance for material loading may be provided.

Owing to the aforesaid arrangement wherein the roller 21b of the paired rollers 21 facing the inner side of core-set of recording paper P is made of a material having lower frictional resistance and good slidableness, while, roller 21b located to be opposite to the core-set is made of a material having higher frictional resistance, the recording paper can be inserted smoothly between the paired conveyance rollers 21, even if tip P1 of recording paper P comes in contact with the roller made of a material having lower frictional resistance and good slidableness.

Figure 14:
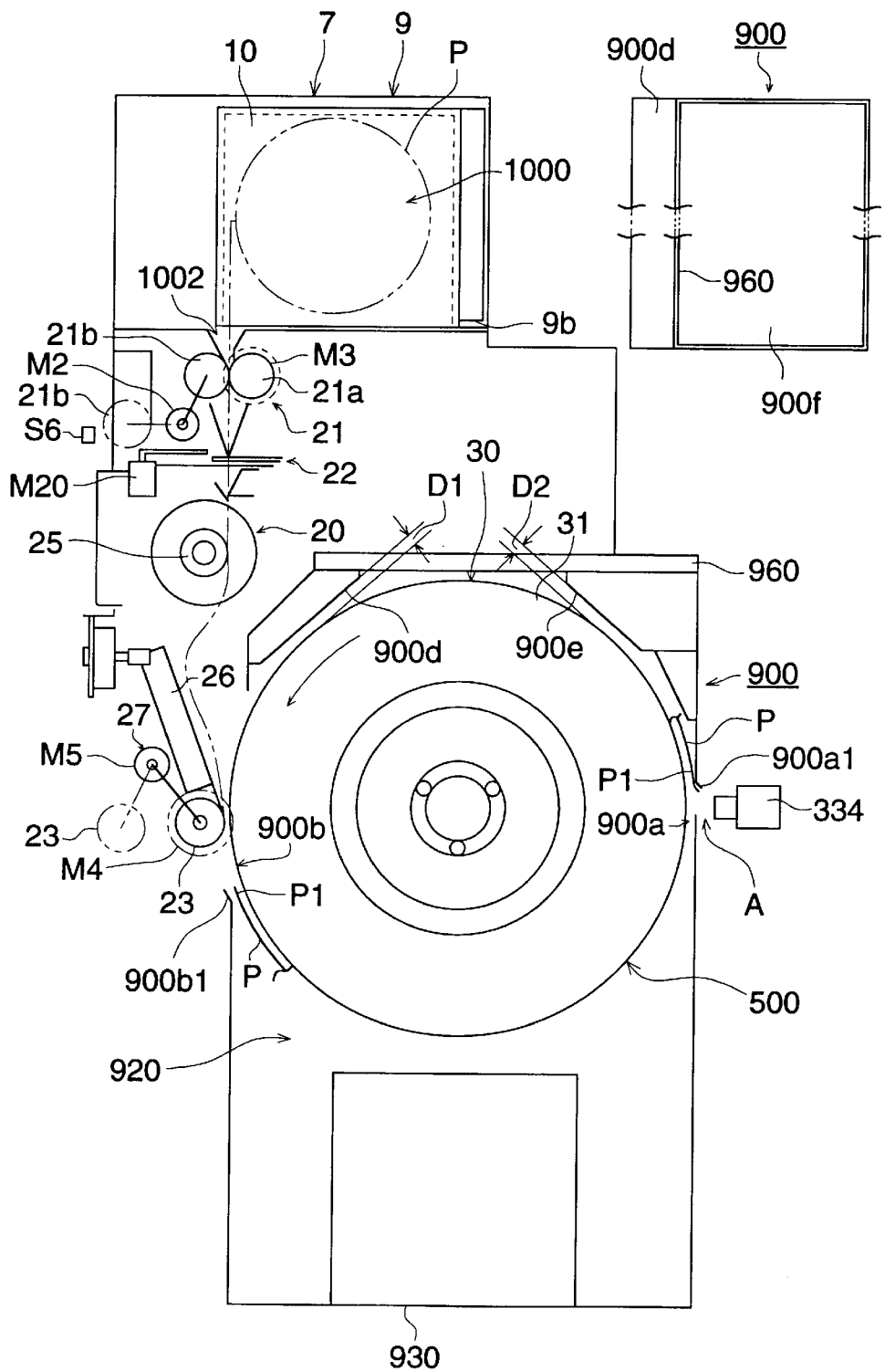
FIGS. 14(*a*) and 15(*a*) each is a schematic sectional view showing a cover for shielding a recording paper, a setting section, a feeding section and an exposing section.

As shown in FIG. 14, exposure section 500 is provided with cover 900 which covers the surrounding of drum 31 and is provided with recording light emerging opening 900a and material ejecting opening 900b. On the cover 900, jam clearance port 900c is provided on the lower portion of the cover, and clearances D1 and D2 which are between the cover and the drum 31 located respectively at the upper left and the upper right are made to be equal, and inclined surfaces 900d and 900e which are respectively in the directions of tangent lines which respectively are tangent to the curved portions of the drum 31 surface, are provided. It is preferable that clearances D1 and D2 which are between the cover and the drum 31 and are located respectively at the upper left and the upper right are within a range of 5–30 mm. Further, on the lower portion of the cover 900, there is provided space 610 where recording papers separated from the drum 31 can stay, and the space 910 is communicated with the jam clearance port 900c.

Owing to the space 910 where recording papers can stay, only a clearance between the cover 900 and the drum 31 in the specific direction is made to be broad to be turnout section 920 for a jammed recording paper.

Since a clearance between the cover 900 and the drum 31 in the specific direction only is made to be broad to be turnout section 920 for a jammed recording paper, as stated above, recording paper P which is separated from the drum 31 by the high speed rotation of the drum 31, for example, can stay, and even if a recording paper is separated from drum 31, a user can remove the recording paper P from jam clearance port 900c easily and safely by opening cover 930 of the jam clearance port 900c, which improves productivity of a recording apparatus.

Since the jam clearance port 900c is arranged at the lower portion of cover 900, then, clearances D1 and D2 which are between the cover and the drum 31 located respectively at the upper left and the upper right are made to be equal, and there are provided inclined surfaces 900d and 900e which are respectively in the directions of tangent lines which respectively are tangent to the curved portions of the drum 31 surface, and there is further provided space 901 where recording paper P separated from the drum 31 at the lower portion of the cover, the clearance can be broadened at the lower portion, and separated recording paper P can stay there. In addition, because of the structure of the cover 900 wherein clearances D1 and D2 are small and inclined surfaces 900d and 900e are provided, recording paper P separated by high-speed rotation and hits the cover 900 still can run through the clearances D1 and D2 without being torn because of the narrow clearances, and then is completely separated from the drum 31 and goes away from it in the space 901 at the lower portion where the clearance is broad, then, hits the inner wall of the cover to be unable to follow the rotation further on, and falls downward to be easily taken out of the jam clearance port 900c.

Since recording light emerging opening 900a and material ejecting opening 900b of the cover 900 are formed to have tapered forms 900a1 and 900b1 respectively, it is possible to reduce the shock given to tip P1 of recording paper P, and thereby to prevent that the recording paper P is smashed or torn.

Figure 15A:
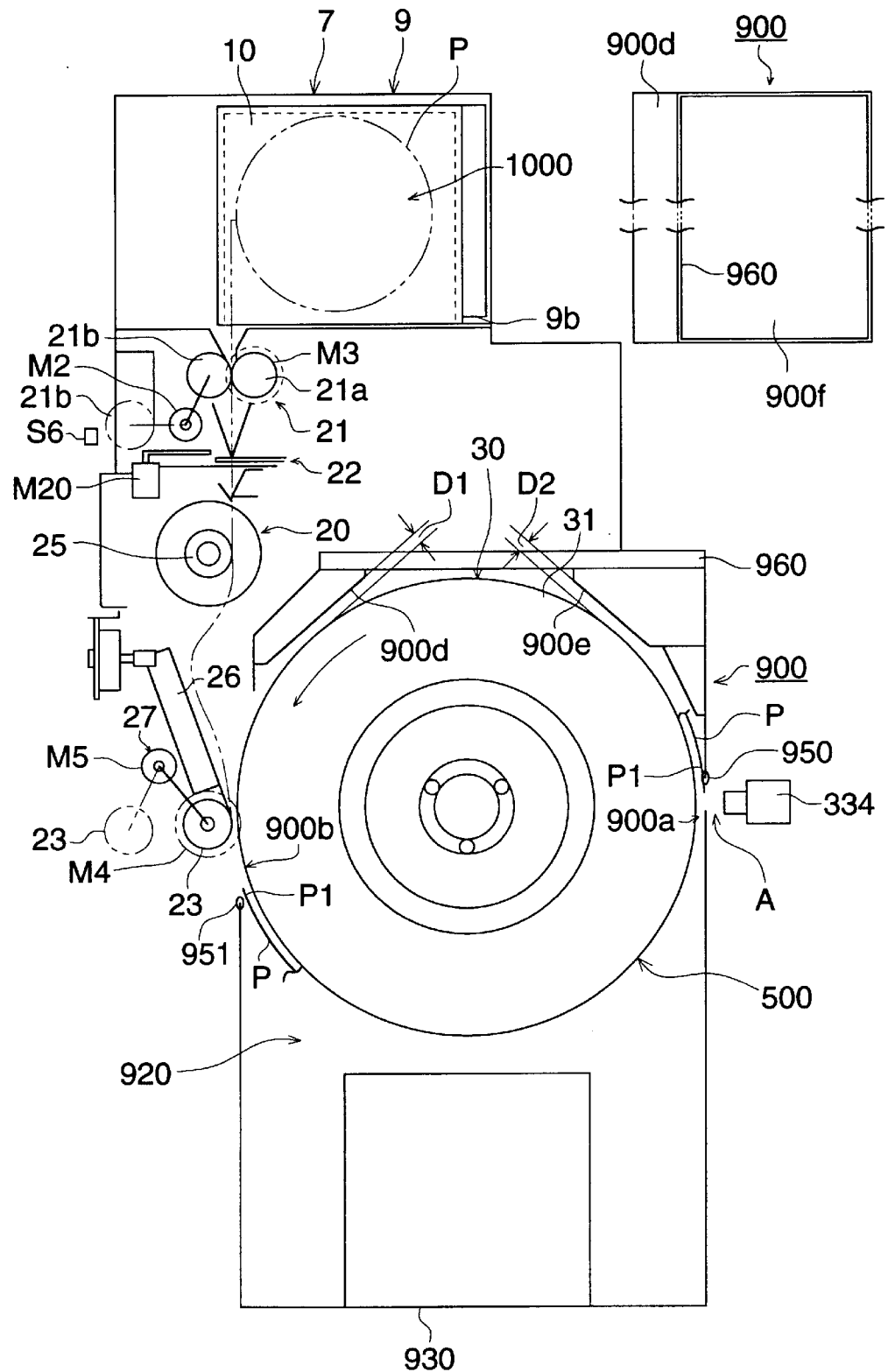
Figure 15B:
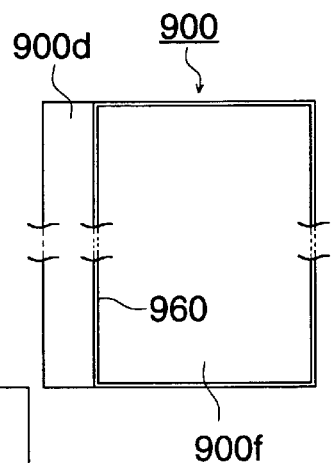

It is also possible to provide shock absorbing members 950 and 951 such as rubber respectively on recording light emerging opening 900a and material ejecting opening 900b of the cover 900 as shown in FIG. 15, which can reduce the shock given to tip P1 of recording paper P, and thereby to prevent that the recording paper P is smashed or torn.

On the upper portion outside the cover 900, there is provided surrounding member 960 which surrounds cover top surface 900f. The surrounding member 960 may either be provided solidly with the upper portion outside the cover 900 or be provided separately to be united. Since the surrounding member 960 which surrounds cover top surface 900f is provided on the upper portion outside the cover 900 as stated above, even when a user or a maintenance machine drops machine screws, clips or pens when the top panel 5 is opened for maintenance, the surrounding member 960 blocks their way to stop them on the cover top surface 900f, preventing them from falling to the lower portion from the outside of the cover 900, which checks secondary damage. With this manner, the cover 900 may be constructed by two member or more, however, the cover 900 may be constructed by a single member.

Next, how to produce a color proof will be explained as follows. Exposure is carried out in the following way. First of all, a paper is taken out of paper cartridge 10 in which the paper wound so as to place the light sensitive surface to face the outside is accommodated, is fed out by a paper-feeding means composed of paired rollers 21a and 21b, is cut in the requested size, is further fed through guide 26, and is conveyed to drum 31 as shown in FIG. 11 (a perspective view of drum 1).

Incidentally, the paper is fed, with its light-sensitive surface facing outside, onto the drum 31. Due to this, close contact of the paper to the drum 31 performed by suction described afterwards is made to be excellent, and thereby, it is possible to prevent that the paper is lifted from the drum 31. Incidentally, in the present embodiment, there is shown an example wherein a paper is wound and housed in a paper cartridge with its light-sensitive surface facing outside, and the paper is fed, with its light-sensitive surface facing outside, onto the drum. However, for obtaining the effect stated above, the direction (showing the side of the paper facing outside when the paper is wound) in which the paper is wound to be housed in the paper cartridge, and the direction (showing the side of the paper facing outside when the paper is wound around the drum) in which the paper is wound around the drum 1 have only to agree in terms of direction, and these directions can be selected, taking an arrangement with a recording means to record images into consideration, Further, compared with an occasion wherein a paper housed in a shape of a roll is cut to a prescribed size before image recording, and a paper cut to a prescribed size is housed and then is fed, it is possible to restrain paper feeding failure in lower cost and to stabilize image recording operations.

When the paper is fed, a leading edge of paper P enters leading edge positioning groove 31g on the circumferential surface of the drum 31, and thereby positioning of the leading edge of the paper on the circumferential surface of the drum is carried out.

Incidentally, an arrangement is made so that a rotation position of the drum 31 may be detected, and it is so established that the drum 31 is rotated and is stopped so that the position of the leading edge positioning groove 31g on the drum 31 may always be constant when feeding a paper.

Accordingly, positioning of the leading edge of paper P can be carried out stably when feeding papers.

When the leading edge of a paper touches the drum 31, blower 207 operates to start suction of air through plural suction holes 4 provided on the circumferential surface of the drum 1, and to rotate the drum 1 in the arrowed direction.

On the other hand, after feeding a paper in a prescribed length to be wound around the circumferential surface of the drum 31, the paper is cut by cutter 22.

In addition, when feeding a paper, squeeze roller 27 simultaneously comes in pressure contact with the circumferential surface of the drum 31 to cause paper P to be brought into pressure contact with the circumferential surface of the drum 31.

Due to this, the paper can be brought into close contact with the circumferential surface of the drum 31 under a good condition. Further, since this roller can be brought into contact with the drum and can be separated from the drum, when the drum 31 is rotated at high speed, it is possible to prevent that the high speed rotation is disturbed by the roller, by separating it from the drum 31.

Due to air suction carried out by the blower 37, the leading edge of paper P is brought into close contact with the circumferential surface of the drum 31 by suction force applied through suction holes 31h on the circumferential surface of the drum 31.

Then, the drum 31 rotates slowly in the arrowed direction while sucking the paper P, and the squeeze roller 27 rotates while bringing the paper P into pressure contact with the circumferential surface of the drum 31, thereby, the paper cut in a prescribed size comes in close contact with the circumferential surface of the drum 31 to be held fixedly.

After the paper P is wound around the circumferential surface of the drum 31, the squeeze roller 27 is separated from the drum 31.

In this case, it is preferable that a surface member of the squeeze roller 27 is an elastic body, and it is especially preferable that Shore A hardness of the elastic body is 80 or less. Due to this, the squeeze roller is subjected to elastic deformation to make the paper to be brought into close contact with the drum sufficiently.

Optical head 500 irradiates the paper held on the circumferential surface of the drum 1 with blue, green and red laser beams, based on image data stored in a storage section, while the drum 31 is rotated, under the condition that the paper is wound around and held fixedly on the drum 31, at high speed of the prescribed constant rotating speed with the number of rotations ranging from 1200 rpm to 3000 rpm. Owing to irradiation of these laser beams for three colors, a latent image is formed on the paper.

The rotating speed of the drum in the course of image recording is higher than that in the case of feeding a paper onto the drum 31. In the course of feeding a light sensitive paper, therefore, it is possible to feed the light sensitive paper in a stable manner, and it is possible to record at high speed when forming latent images. With regard to the timing to start high speed rotation, it is especially preferable to start the high speed rotation after the paper has been wound around the drum 31 completely, and after the suction has been started.

The peripheral speed of the drum 31 in the course of image recording is preferably 3 m/s or more, and it is further preferable that the peripheral speed is 10 m/s. When the peripheral speed is 70 m/s, in particular, specific mechanical strength is not required, which makes the cost to be low and makes the machine not to be so heavy, thus the place of installation is not limited in particular, making it possible to install in a convenient location.

The peripheral speed of the drum 31 in the course of paper feeding to the drum 31 is preferably 2 m/s or less. Due to this, it is possible to enhance the close contact of the paper to the drum and to improve holding capability by suction.

A width of the drum 31 in its axial direction preferably is 30 cm or more when an exposure apparatus is for making a color proof, and 50 cm or more is especially preferable. The width of 2 m or less (in particular, 1 m or less) is preferable. Due to this, specific mechanical strength is not required, which makes the cost to be low and makes the machine not to be so heavy, thus the place of installation is not limited in particular, making it possible to install in a convenient location.

Eccentricity of the drum 31 preferably is 100 μm or less (in particular, 50 μm or less). Due to this, irregular rotation can be restrained, high speed rotation is made to be possible, and even highly detailed exposure is made to be within the depth of focus.

After image recording (formation of latent image), the rotating speed of the drum 31 is lowered.

Then, the blower 200 is controlled to release air suction from the circumferential surface of the drum 31, and exfoliation guide 51 is brought into contact with the circumferential surface of the drum 31 to separate the paper P on which the latent image is formed from the circumferential surface of the drum 31.

When the exfoliation guide 51 is provided as stated above, a paper is separated from the drum in the prescribed area, which makes it easy to convey the paper to the processing section for processing exposed paper (for example, development processing section). As the exfoliation guide, an exfoliation claw, an exfoliation paper, an exfoliation plate, a sucker, and a push-out pin for exfoliation may be used.

The separated paper P is ejected out of the exposing apparatus 3 by ejection section along a prescribed ejection path, and then is conveyed to the processing apparatus 4.

After that, the paper P on which the latent image is formed is processed through processing means 41–45 such as developing and fixing in the processing apparatus 4, and it turns into a color proof on which a color proof image corresponding to image data for electronic plate-making is recorded to be ejected on exit tray 15 provided outside the processing apparatus 4.

Next, operation control of the present apparatus will be explained.

Figure 16:
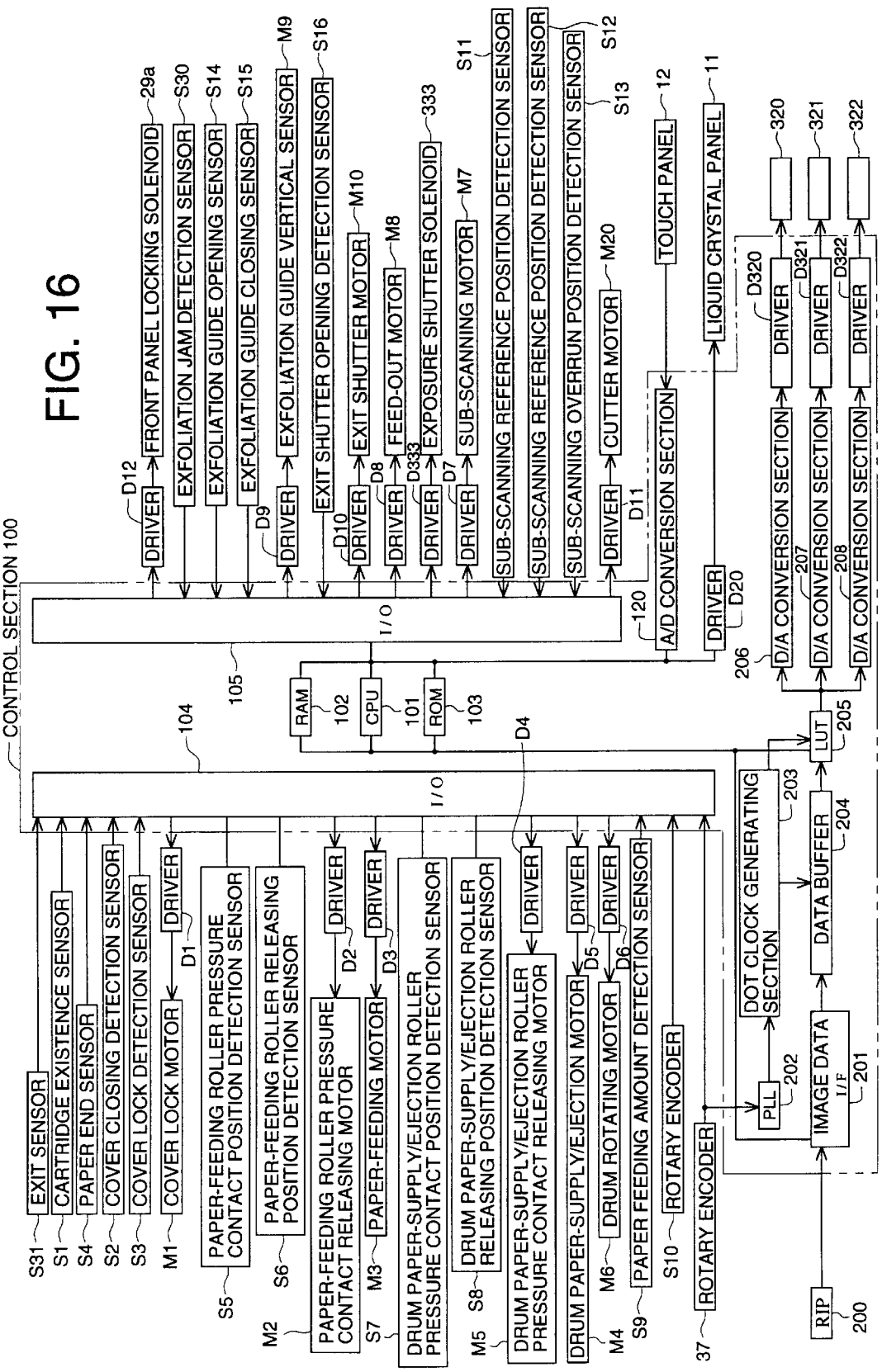
FIG. 16 is a block diagram showing the electrical structure of an image forming apparatus.

FIG. 16 is a block diagram showing the electrical structure of the apparatus. As shown in FIG. 16, control section 100 has therein CPU 101, RAM 102 and EOM 103, and is connected to sensors and a group of actuators through I/O ports 104 and 105 to control the group of actuators based on information coming from the sensors.

The sensors to be connected include cartridge existence sensor S1 stated above, paper-feeding cover closing detection sensor S2, paper-feeding cover lock detection sensor S3, paper end sensor S4, paper-feeding roller pressure contact position detection sensor S5, paper-feeding roller releasing position detection sensor S6, drum paper supply/ejection roller pressure contact position detection sensor S7, drum paper supply/ejection roller releasing position detection sensor S8, paper leading edge reference position sensor S9, paper conveyance quantity detection sensor S10, rotary encoder 37, sub-scanning reference position detection sensor S11, sub-scanning writing position detection sensor S12, sub-scanning overrun position detection sensor S13, peeling guide opening sensor S14, peeling guide closing sensor S15, exit shutter opening detection sensor S16, peeling jam detection sensor S30 and exit sensor S31.

As a group of actuators, there are connected paper-feeding lock motor M1, paper-feeding roller pressure contact releasing motor M2, paper-feeding motor M3, cutter motor M20, drum paper supply/ejection motor M4, drum paper-feeding roller pressure contact releasing motor M5, drum rotating motor M6, sub-scanning motor M7, exposure shutter solenoid 333, feed out motor M8, peeling guide up and down motor M9, exit shutter motor M10, and front panel lock solenoid 29a which are driven respectively through drivers D1, D2, D3, D11, D5, D4, D6, D7, D333, D8, D9, D10 and D12.

On operation section 8, liquid crystal panel 11 is controlled by driver D20 to display the state of operation of an image forming apparatus. A command by operation from touch panel 12 is transmitted to CPU 101 as digital information by A/D conversion section 120.

Half tone dot image data in the raster image format are produced from image data for an electronic plate making process by RIP 2000 which is located outside the present apparatus and connected to the present apparatus. The produced digital half tone dot image data are sent through image data I/F section 201 to data buffer 204 from. On the other hand, in synchronization with output signals of PLL 202 based on paper feeding information from rotary encoder 37, digital half tone dot image data are given to drivers D 320, D 321 and D 322 through LUT (look-up table) 205 and D/A conversion sections 206–208 from data buffer 204 by dot clock produced by a dot clock producing section 203, and thereby these drivers D 320, D 321 and D 322 respectively drive red laser light source 320, green laser light source 321 and blue laser light source 322.

Here, half tone dot image data for respective colors (Y, M, C and BK) produced by the RIP 2000 are transferred to image data I/F section 201 where the half tone dot image data are converted from a raster image format into the format for exposure for every 10 scanning lines, and then are accumulated in data buffer 204. After the image data for one paper are accumulated in the data buffer 204, exposures for all colors are conducted.

Figure 17:
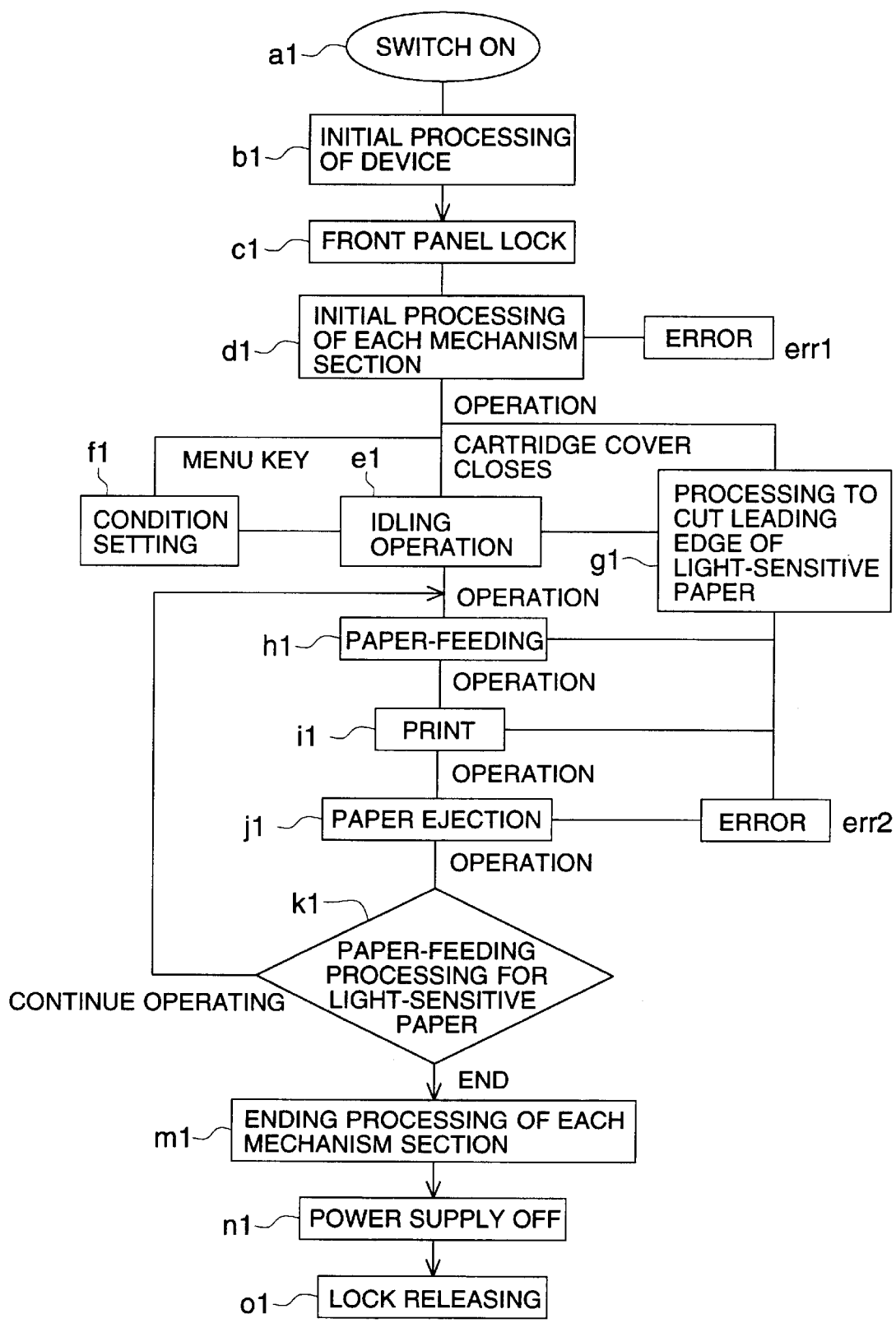
FIG. 17 is a main flow chart for operations of an image forming apparatus.
Figure 18:
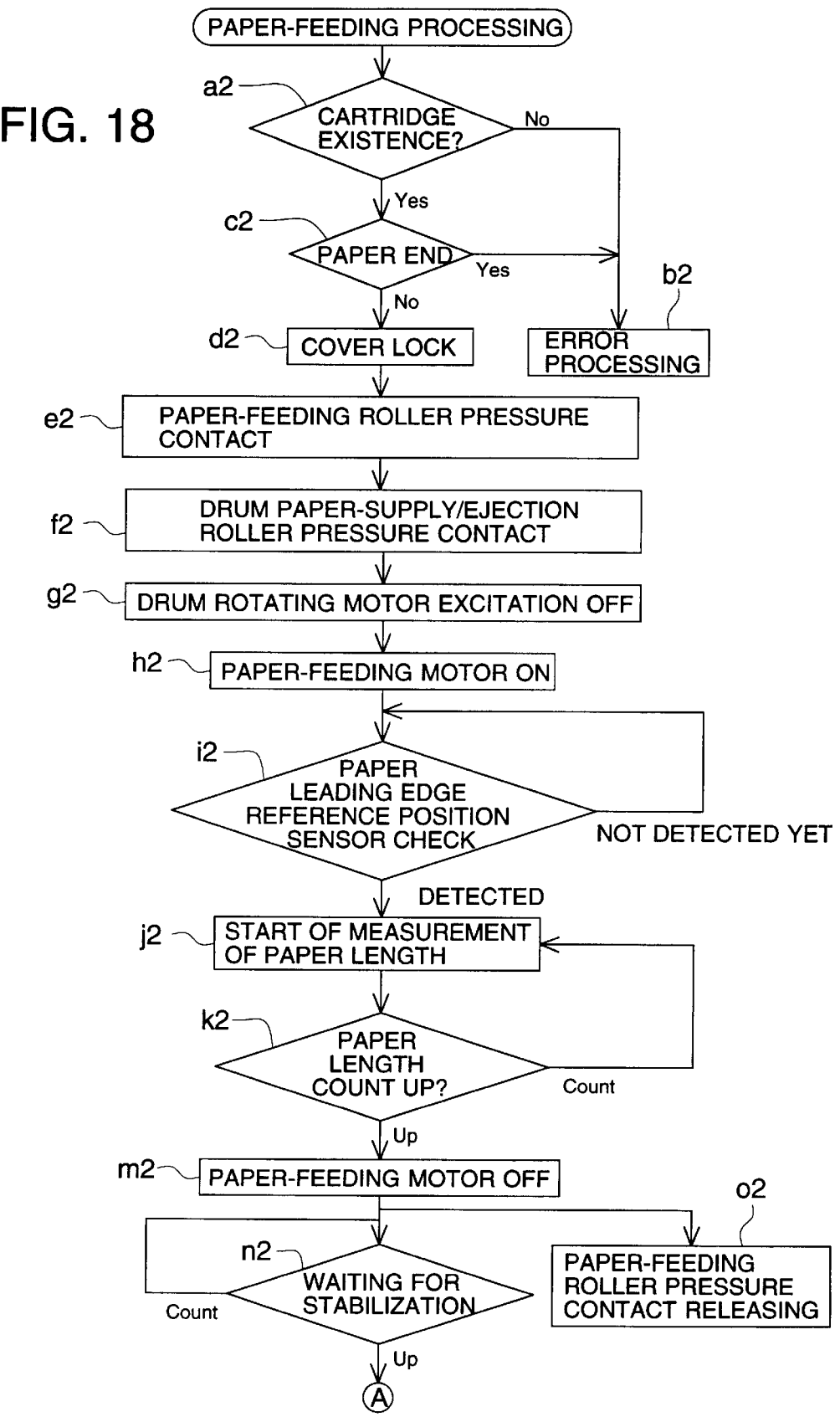
FIG. 18 is a flow chart for paper-feeding processing of an image forming apparatus.
Figure 19:
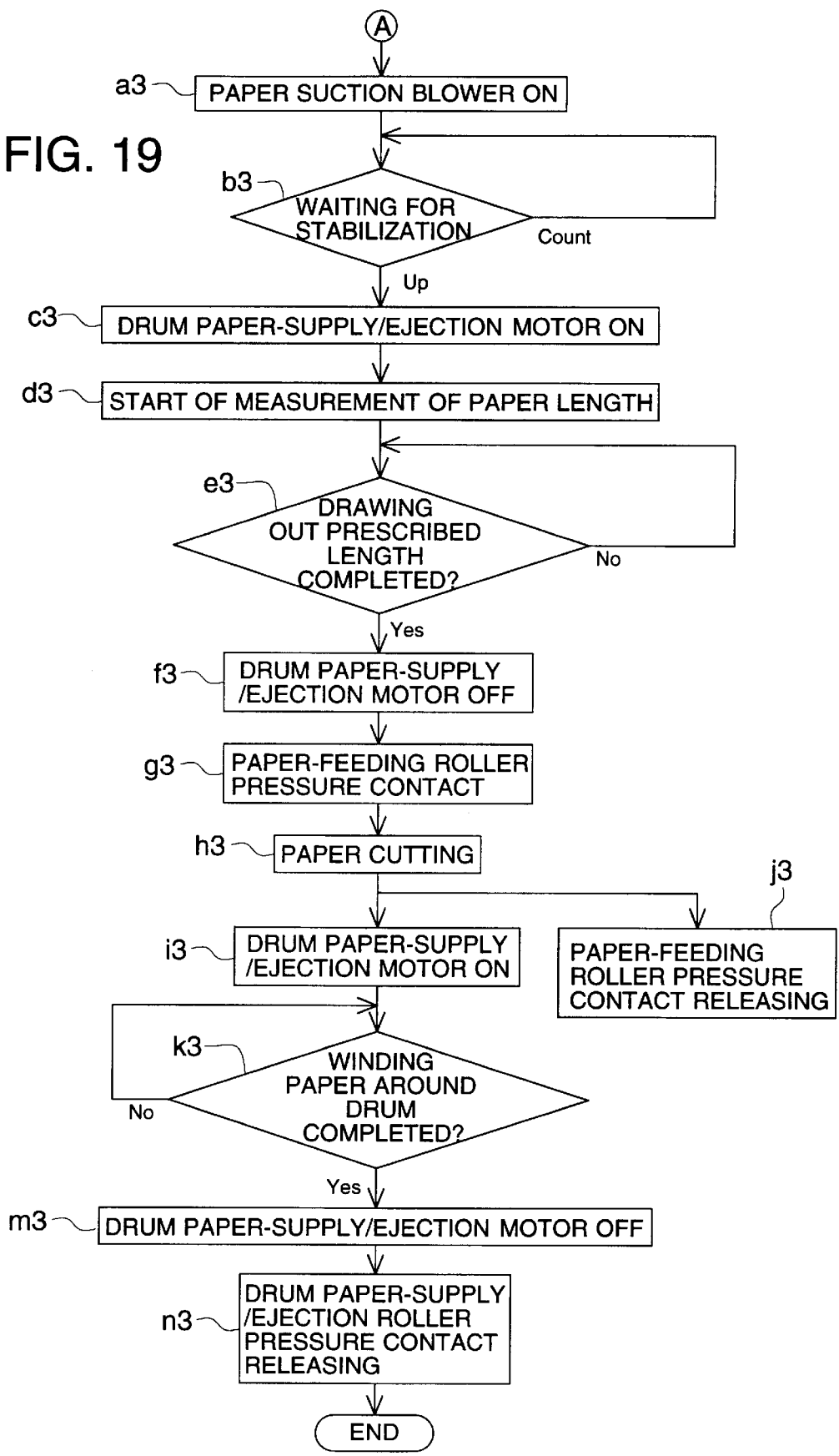
FIG. 19 is a flow chart for paper-feeding processing of an image forming apparatus.
Figure 20:
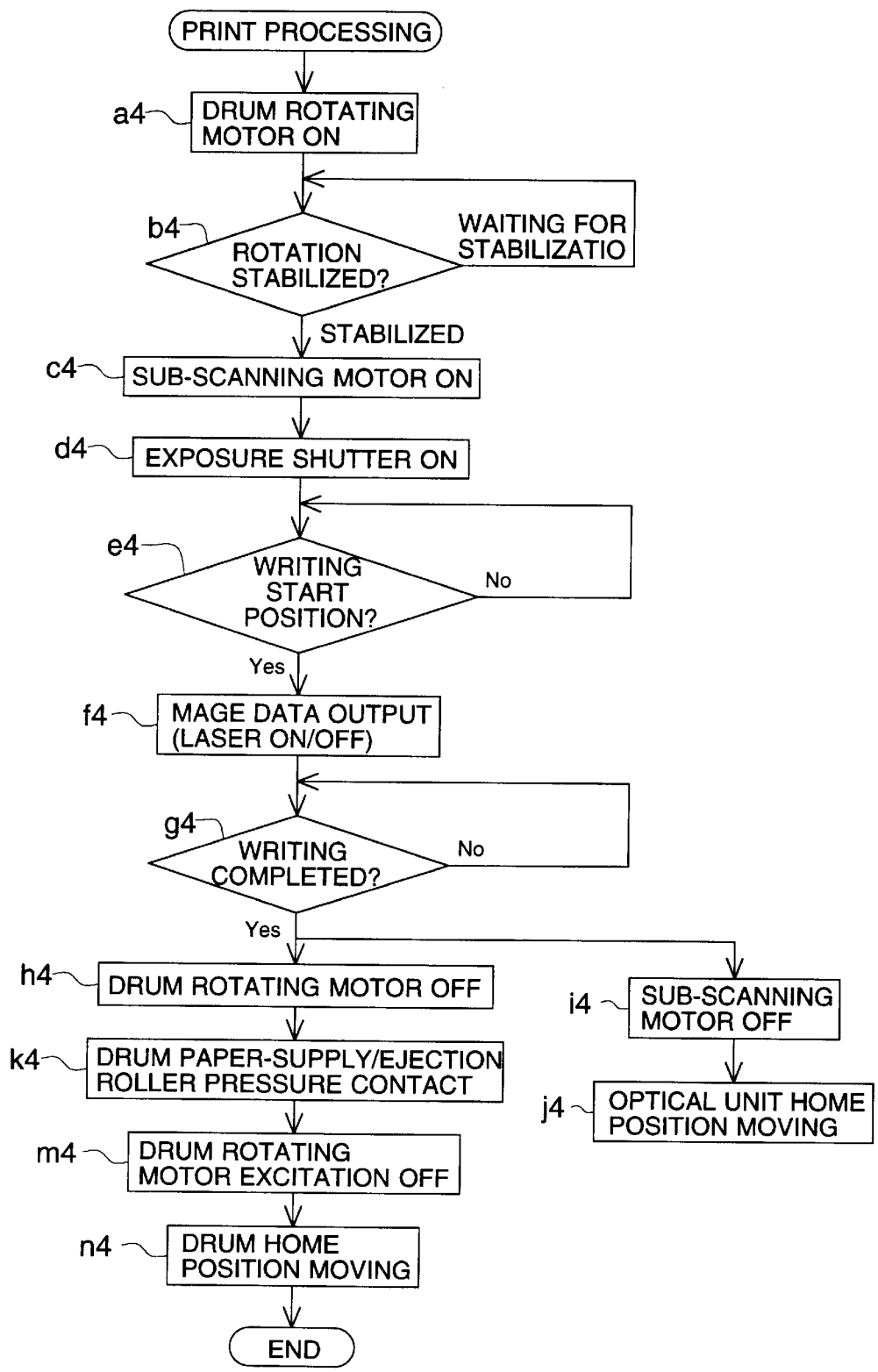
FIG. 20 is a flow chart for print processing of an image forming apparatus.
Figure 21:
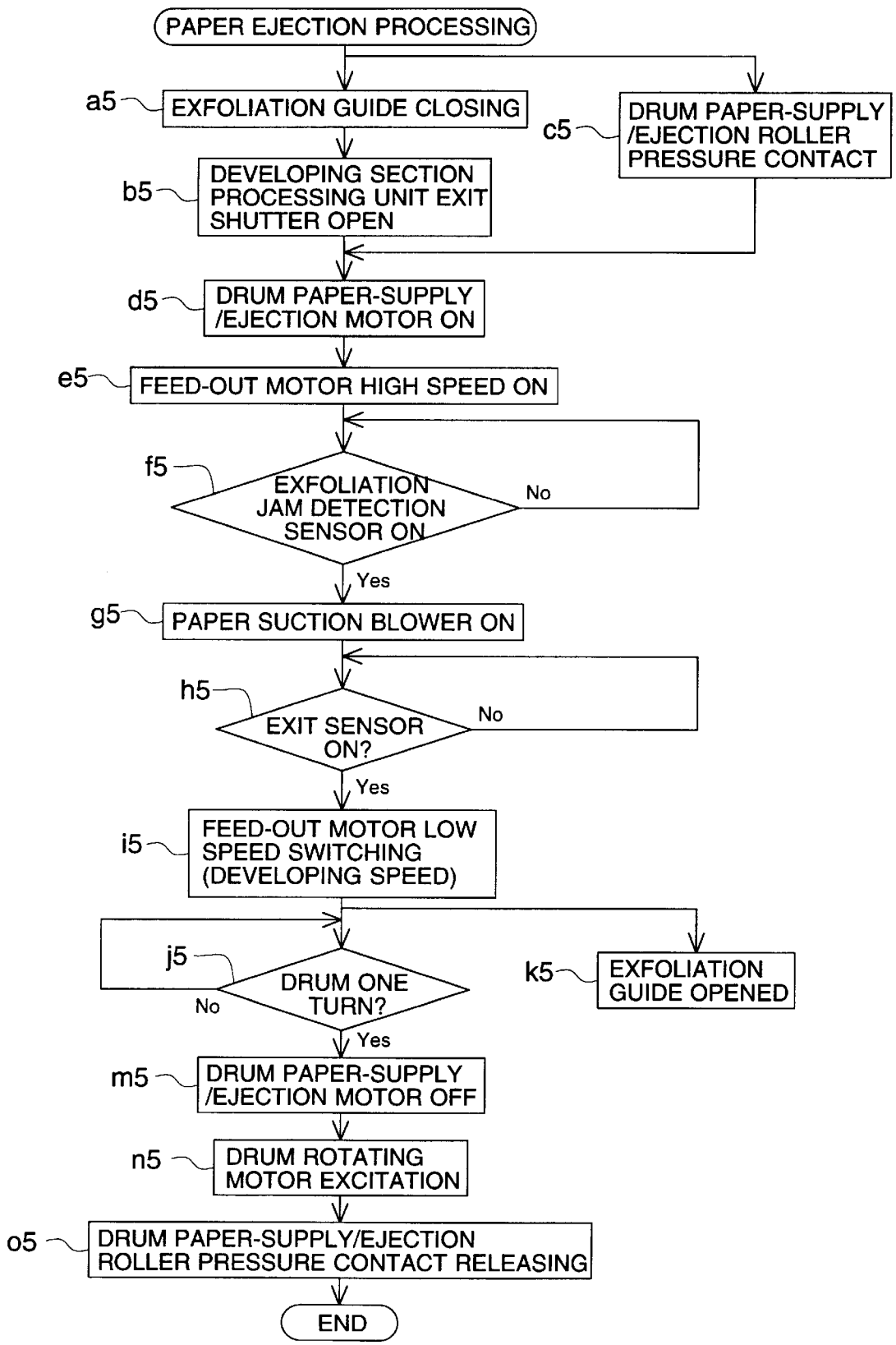
FIG. 21 is a flow chart for paper ejection processing of an image forming apparatus.
Figure 22:
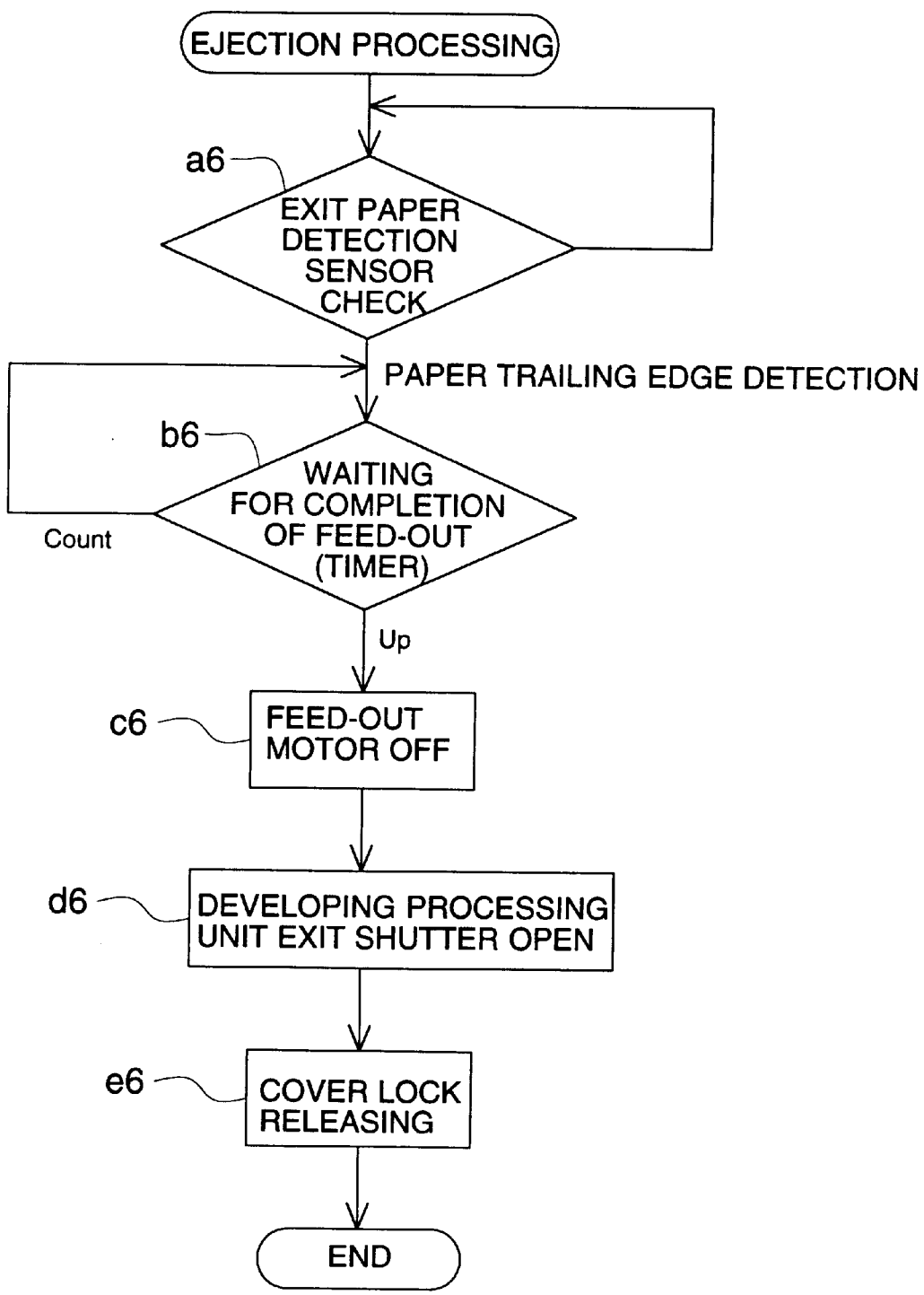
FIG. 22 is a flow chart for ejection processing of an image forming apparatus.
Figure 23:
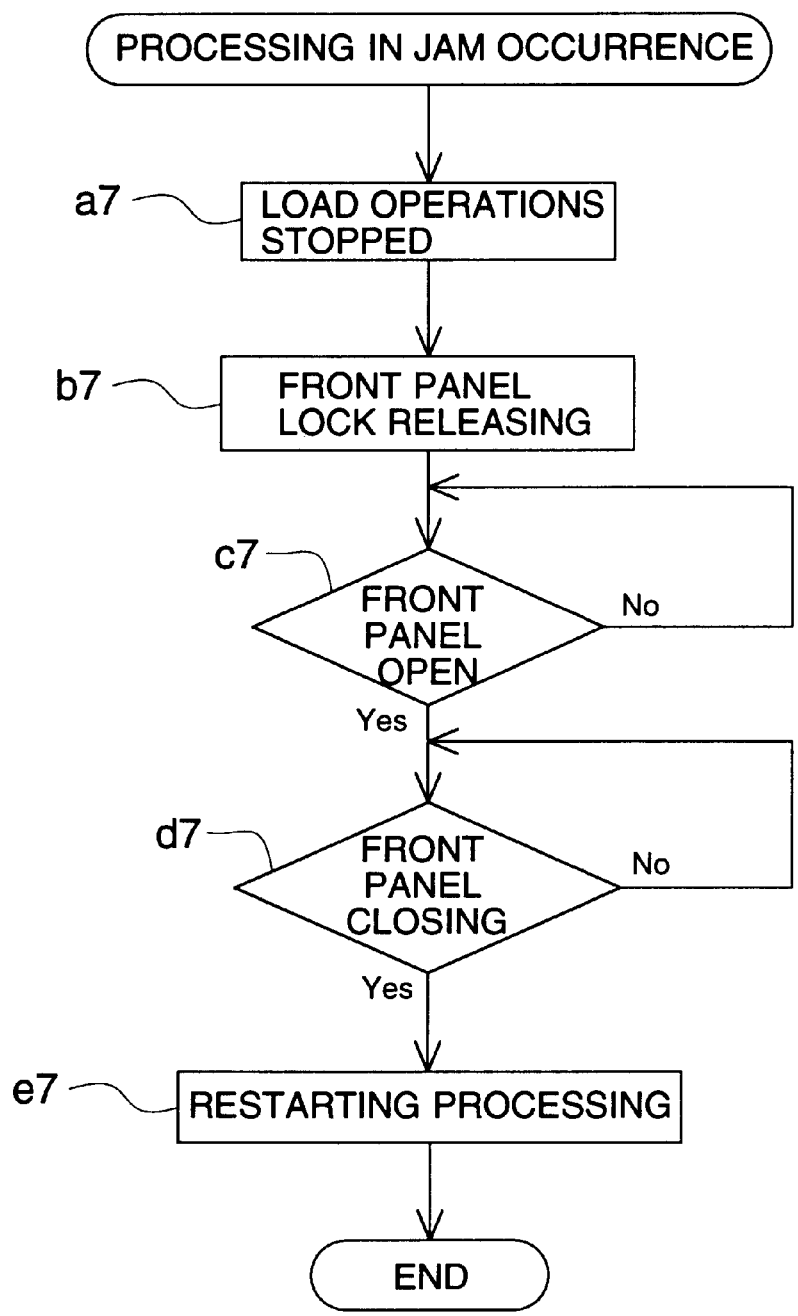
FIG. 23 is a flow chart for illustrating processing in the case of occurrence of a jam.

Operations of an image forming apparatus will be explained based on FIG. 17 through FIG. 23. FIG. 17 is a main flow chart for operations of an image forming apparatus, FIG. 18 is a flow chart for paper-feeding processing of an image forming apparatus, FIG. 19 is a flow chart for paper-feeding processing of an image forming apparatus, FIG. 20 is a flow chart for print processing of an image forming apparatus, FIG. 21 is a flow chart for paper ejection processing of an image forming apparatus, FIG. 22 is a flow chart for ejection processing of an image forming apparatus, and FIG. 23 is a flow chart for illustrating processing in the case of occurrence of a jam.

First, main operations of an image forming apparatus will be explained. In the main flow chart of operations of an image forming apparatus in FIG. 17, when a main switch is turned on at step a1, electrical devices of the apparatus are subjected initializing at step b1. In initializing at step b1, loading of program and data on RAM 102 is conducted.

After completion of initializing in step b1, front panel 6 is locked by locking mechanism 29 (step c1).

After locking by locking mechanism 29 is confirmed, each mechanism section if initialized in step d1, and when an error (err 1) occurs, functions are stopped. In initializing in step d1, drum 31 and optical unit 32 are returned to their initial positions.

An idling operation is conducted and remote processing becomes possible (step e1). With the idling operation, each roller of conveyance path 80 starts rotating. During this period of idling operation, it is possible to establish conditions by operating a menu key of touch panel 12 of operation section 8 (step f1). This establishment of conditions thus conducted makes local processing possible. When conditions are not established through the operation of a menu key of touch panel 12, there is conducted remote processing wherein an output image from RIP is received and a print of received image data is executed.

When light-sensitive materials are used up and replenishment therefor is conducted in the course of idling operations, there is conducted paper-feed processing wherein paper-feed cover 9 is opened, cartridge 10 is set, paper-feed cover 9 is closed, and a paper-feed processing to cut a fogged portion on the leading edge of the light-sensitive material is conducted, to return to the idling operation (step g1). However, when an error (err 2) occurs in the paper-feed processing to cut a fogged portion on the leading edge of the light-sensitive material, functions are stopped. Functions to be stopped in this case are driving of the conveyance system and an operation of cutter 22, and the paper is stopped on conveyance path 80. When this error (err 2) is caused, a processing for jam occurrence (see FIG. 23) is started.

Writing operations are composed of paper-feeding (step h1), print (step i1), and paper ejection (step j1), and completion of this writing processing makes the conveyance of the following light-sensitive material possible (step k1).

When ending the operations, operations of mechanisms such as paper-feeding section 20, main scanning section 30, sub-scanning section 40, first paper ejecting section 50, accumulating section 60, conveyance path 80, developing section 42, fixing section 43, stabilizing section 44, drying section 45 and second paper ejecting section 15 are completed by operations of stop buttons (not shown) (step m1). After that, when the power supply is turned off (step n1), locking of locking mechanism 29 is released by the operation of front panel locking solenoid 29a (stated later) (step o1).

Next, paper-feeding processing of an image forming apparatus will be explained. In the flow chart for paper-feeding processing of an image forming apparatus in FIG. 18, existence of cartridge 10 is judged in step a2, and when there is no cartridge 10, error processing is conducted (step b2).

When there is cartridge 10, detection for the trailing edge of a light-sensitive material is conducted based on detection signals from paper end sensor S4 (step c2), and when the trailing edge of the light-sensitive material is detected, error processing is conducted (step b2).

When the trailing edge of the light-sensitive material is not detected, paper-feeding cover 9 is locked (step d2), paper-feeding roller 21b is brought into pressure contact (step e2), and drum paper supply/ejection roller 23 is further brought into pressure contact (step f2). Then, excitation of drum rotating motor M^ is turned off to make the rotation of drum 31 possible (step g2), and paper-feeding motor M3 is rotated to convey a light-sensitive material with paper-feeding rollers 21a and 21b (step h2).

Then, a leading edge section of the light-sensitive material is subjected to detection by paper leading edge reference position sensor S9 (step i2), and when the leading edge section is detected, measurement of a length of the light-sensitive material is started by the rotation of encoder roller 25 with a reference of the detection (step j2) to convey the light-sensitive material. Then, the length of the light-sensitive material is counted from how long it was conveyed, and when the length arrives at the prescribed length (step k2), paper-feeding motor M3 is stopped (step m2) to wait for stabilization for the prescribed period of time (step n2) and pressure contact of paper-feeding roller 21b is released (step o2) so that the light-sensitive material can be conveyed by rotation of drum supply/ejection roller 23 and drum 31.

In the flow chart for paper-feeding processing of the image forming apparatus shown in FIG. 19, paper suction blower P1 is turned on in step a3, then the blower is left to operate until it is stabilized (step b3), and drum paper supply/ejection motor M4 is turned on after the blower is stabilized (step c3). Due to this, a paper is wound around drum 31 while the paper keeps being sucked to drum 31.

The peripheral speed of the drum 31 in the course of paper feeding preferably is 2 m or less (in particular, 1 m/sec or less). Due to this, the paper can be fed to the drum 31 stably, enhancing the close contact of the paper to the drum 31 and improving the holding capability by suction. Further, the peripheral speed of the drum 31 in the course of paper feeding preferably is 2 cm/sec or more (in particular, 5 cm/sec or more). Due to this, the paper feeding time can be shortened, and it is possible to shorten the image recording time and its interval. When the peripheral speed is less than 2 cm/sec, the effect of close contact to the drum is saturated. In the unit of the present embodiment, it is 0.1 m/sec.

Measurement of paper length is started in step d3, and when the paper has been drawn out by a prescribed length (step e3), the drum paper supply/ejection motor M4 is turned off in step f3. Paper-feeding roller 21b is brought into pressure contact in step g3, then the paper is cut in the step h3, the drum paper supply/ejection motor M4 is turned on in step i3, and pressure contact of paper-feeding rollers 21a and 21b is released in step j3.

After the paper has been wound around the drum in step k3, the drum paper supply/ejection motor M4 is turned off in step m3, and pressure contact of drum paper supply/ejection roller 23 is released in step n3.

Incidentally, in the unit of the present embodiment, a period of time from the start of contact between light sensitive paper P and drum 31 to the total contact when winding around the drum 31 is completed is 10×LP seconds for the light sensitive paper having a length of LP (m). For example, the time is about 9.6 sec for the light sensitive paper having the longest paper length (paper length is about 0.96 m). However, without being limited to this, the time from the start of contact between light sensitive paper P and drum 31 to the total contact when winding around the drum 31 is completed is preferably 0.5×LP sec or more (in particular, 2×LP sec or more) for the length of LP (m) of the light sensitive paper from a viewpoint of close contact of light sensitive paper P to the drum 31, and it preferably is 50×LP sec or less for the length of LP (m) of the light sensitive paper from a viewpoint of efficiency of paper feeding.

In the flow chart for print processing of the image forming apparatus shown in FIG. 20, drum rotating motor M6 is turned on in step a4, then drum 31 is left to rotate until its rotation is stabilized (step b4), sub-scanning motor M7 is turned on (step c4), then, exposure shutter 332 is turned on (step d4), and optical unit 32 moves in the direction of the drum axis to conduct sub-scanning. Thus, sub-scanning writing position is detected in step e4, and image data are outputted (step f4).

In this case, red laser light source 320, green laser light source 321 and blue laser light source 322 respectively emit light based on data of LUT of established channel, and exposes with an image having a color corresponding to the color of ink and/or the color of a print paper used in the printing.

The preferable rotating speed of drum 31 in the course of image recording is 5000 rpm or less (in particular, 4000 rpm or less). Due to this, rotation of drum 31 is stabilized, the time required for the rotating speed to be stabilized can be shortened, the unit cost can be reduced, safety is high, no specific mechanical strength is required, low cost is materialized, machine weight can be controlled, and a place of installation is not limited in particular, making it possible to install at convenient location. The rotating speed of the drum 31 in the course of image recording in the unit of the present embodiment is 2000 rpm. It is preferable that the peripheral speed of drum 31 in the course of image recording is 3 m/sec or more (in particular, 5 m/sec or more, further, 10 m/sec or more). Due to this, the image recording time can be shortened. The peripheral speed of drum 31 in the course of image recording preferably is 70 m/sec or less (in particular, 50 m/sec or less). Due to this, the peripheral speed of drum 31 is stabilized, the time for the peripheral speed to be stabilized is shortened, unit cost is lowered and safety is attained. Incidentally, the peripheral speed of drum 31 in the course of image recording in the unit of the present embodiment is about 30 (m/sec).

When writing of image data is completed in step g4, drum rotating motor M6 is turned off (step h4) and sub-scanning motor M7 is turned off (step i4), and optical unit 32 is moved to its home position (step j4).

Though the time from the release of driving for rotation of drum 31 to the stop of rotation of the drum 31 in the unit of the present embodiment is 2 sec–15 sec, the time from the release of driving for rotation of a drum to the stop of rotation of the drum is not limited to this, and it preferably is 1 sec or more from viewpoints of stabilized speed reduction for drum 31 and of control of exfoliation of light sensitive paper P, and it preferably is 1 min. or less (in particular, 30 sec or less) from a viewpoint of the efficiency of separation.

Drum paper-supply/ejection roller 23 is brought into pressure contact with drum 31 in step k4, and then, excitation of the drum rotating motor M6 is turned off (step m4) and the drum paper-supply/ejection roller 23 (step n4).

In the flow chart for paper-ejection processing of the image forming apparatus shown in FIG. 21, exfoliation guide 51 is closed for setting at the exfoliation position in step a5, and exit shutter 56 for developing unit 4 is opened (step b5) and is brought into pressure contact with the drum paper-supply/ejection roller 23 (step c5).

Drum paper-supply/ejection motor M4 is turned on in step d5 so that drum paper-supply/ejection roller 23 is rotated, and feed-out motor M8 is turned on for high speed conveyance to send a light-sensitive material (step e5). Exfoliation jam detecting sensor S30 judges whether an exfoliation jam is caused on the light-sensitive material or not (step f5). When the exfoliation jam is not caused, the operation of suction blower P1 is stopped to release the suction of the light-sensitive material (step g5).

In step h5, exit sensor S31 detects ejection of the light-sensitive material, and feed-out motor M8 is switched to the constant speed to be synchronized with processing in the developing unit 4 (step i5). Then, the drum 31 is caused to make one turn (step j5), and the exfoliation guide 51 is opened (step k5).

Drum paper-supply/ejection motor M4 is turned off in step m5, then, excitation of drum rotating motor M6 is conducted so that drum 31 may not rotate freely (step n5), and pressure contact of the drum paper-supply/ejection roller 23 is released to end the paper ejection processing (step o5).

The time from the start of exfoliation to the completion of exfoliation from drum 31 for the light sensitive paper P is about 15–20×LP sec for length LP (m) of the light sensitive paper and is about 15 sec for the maximum paper length of the light sensitive paper (paper length of 0.96 (m)), in the unit of the present embodiment as stated above. However, the time from the start of exfoliation to the completion of the exfoliation for the light sensitive paper is not limited to the foregoing, and it preferably is 0.5×LP sec or more (in particular, 2×LP sec or more) for length LP (m) of the light sensitive paper from viewpoints of stable exfoliation and restraint of jam occurrence, and it preferably is 100×LP sec or less (in particular, 50×LP sec or less) from a viewpoint of exfoliation efficiency.

When occurrence of exfoliation jam is detected in step f5, processing for jam occurrence (which will be explained later, referring to FIG. 22) is started.

In the flow chart for ejection processing of the image forming apparatus shown in FIG. 22, ejection of a light-sensitive material is detected by exit sensor S31 in step a6, and when the trailing edge of the light-sensitive material is detected, feed-out motor M8 is turned off (step c6) after waiting completion of ejection of the light-sensitive material for a prescribed period of time (step b6), then, exit shutter 55 for developing unit 4 is closed, and locking of paper-feeding cover 9 is released to end ejection processing of the light-sensitive material (step e6).

When the light-sensitive material does not pass through the position of exit sensor S31 within the fixed period of time from the start of conveyance of the light-sensitive material, the light-sensitive material is jammed in the conveyance path due to conveyance failure. In the case of image forming apparatus 1, in addition to the exfoliation jam detection sensor S30 and exit sensor S31, there are arranged, on the half way of the conveyance path 80, several optical sensors using light of wavelength in the area where there is no sensitivity of a light-sensitive material. When a light-sensitive material does not pass through the positions of these optical sensors within a prescribed period of time, processing for jam occurrence (see FIG. 22) is started because conveyance failure is caused.

FIG. 23 is a flow chart explaining processing for jam occurrence. When a jam is caused, processing for jam occurrence is started, and loaded operation of each motor is stopped in step a7. The loaded operation of each motor, in this case, includes load for paper-feeding roller 21a driven by paper-feeding motor M3 and load for drum 31 driven by drum rotating motor M6. After a period of time during which the stop of each loaded operation is stabilized, locking of front panel 6 carried out by locking mechanism 29 is released.

When front panel 6 is opened for removing the jammed light-sensitive material, the opening is detected by front panel opening/closing sensor S32 in step c7. Then, the light-sensitive material is removed manually, and if the front panel 6 is closed, the closing is detected by the front panel opening/closing sensor S32 in step d7.

When it is detected that the front panel 6 is closed in step d7, restarting processing is started.

The restarting processing represents operations which are the same as the main operations explained in FIG. 17 wherein when the main switch is turned on in step a1, first, initial processing of electrical devices in the apparatus is conducted in step b1. In the initial processing in step b1, programming to RAM 102 and data loading are carried out.

When the initial processing in step b1 is completed, front panel 6 is locked by locking mechanism 29 (step c1).

When the locking by the locking mechanism 29 is confirmed, initial processing for each mechanism section is conducted in step d1, and when an error (err 1) occurs, functions are stopped. In the initial processing in step d1, drum 31 and optical unit 32 are returned respectively to their initial positions.

Then, procedures which are the same as the steps which follow step e1 are conducted, and explanation of these procedures will be omitted accordingly.

In the image forming apparatus 1 stated above, when conveyance failure is detected, driving of conveyance path 80 is stopped, and then, locking of the front panel 6 is released. Therefore, when there is occurred a jam which requires operations to remove a recording paper, operations to remove the paper can easily be conducted, and yet, safety can be enhanced.

In the image forming apparatus 1 stated above, when it is detected that the front panel 6 is opened once after the occurrence of a jam, and then it is closed, it is taken that the paper is removed from the conveyance path 80, and returning operations are conducted in the order of locking of the front panel 6 and initial processing of each mechanism section. Therefore, operations to remove the paper can easily be conducted, and yet, safety can be enhanced.

Locking mechanism 29 can also be one employing a motor without being limited to a solenoid. In the image forming apparatus 1, when a power supply is turned off, locking of the front panel 6 is released to create the state where the front panel 6 can be opened. Therefore, there is caused no trouble wherein when a power supply is turned off, locking mechanism 29 does not work and keeps preventing the front panel 6 from opening, which is satisfactory.

Since a solenoid is used for locking mechanism 29, in particular, even in the case of an unexpected accident such as a power failure or coming off of a power cord, movable iron core 29b of front panel locking solenoid 29a returns when a power supply is turned off. Therefore, the locking of the front panel 6 can be released to create the state where the front panel 6 can be opened. Accordingly, there is caused no trouble wherein when a power supply is turned off, locking mechanism 29 does not work and keeps preventing the front panel 6 from opening, which is especially satisfactory.

Further, in the case of the state wherein locking mechanism 29 is already locking the front panel 6, it may be either a control flow which accepts only conditions to release locking, or a control flow which continues locking when there is requirement for locking.

Further, under the state where the locking mechanism 29 has already released its locking, it may be either a control flow which accepts only requirement for locking or a control flow which continues lock releasing when there is requirement for lock releasing.

Though there has been shown an example of front panel 6 where front panel 6 is opened and closed on the axis of a hinge, it may also be a sliding door which slides along the rail, or a shutter door which takes up a bellows type member.

Further, it is also possible to lock a cover through the mechanism such as other links or gears, without being limited to locking mechanism employing directly a movable iron core of a solenoid.

Figure 24:
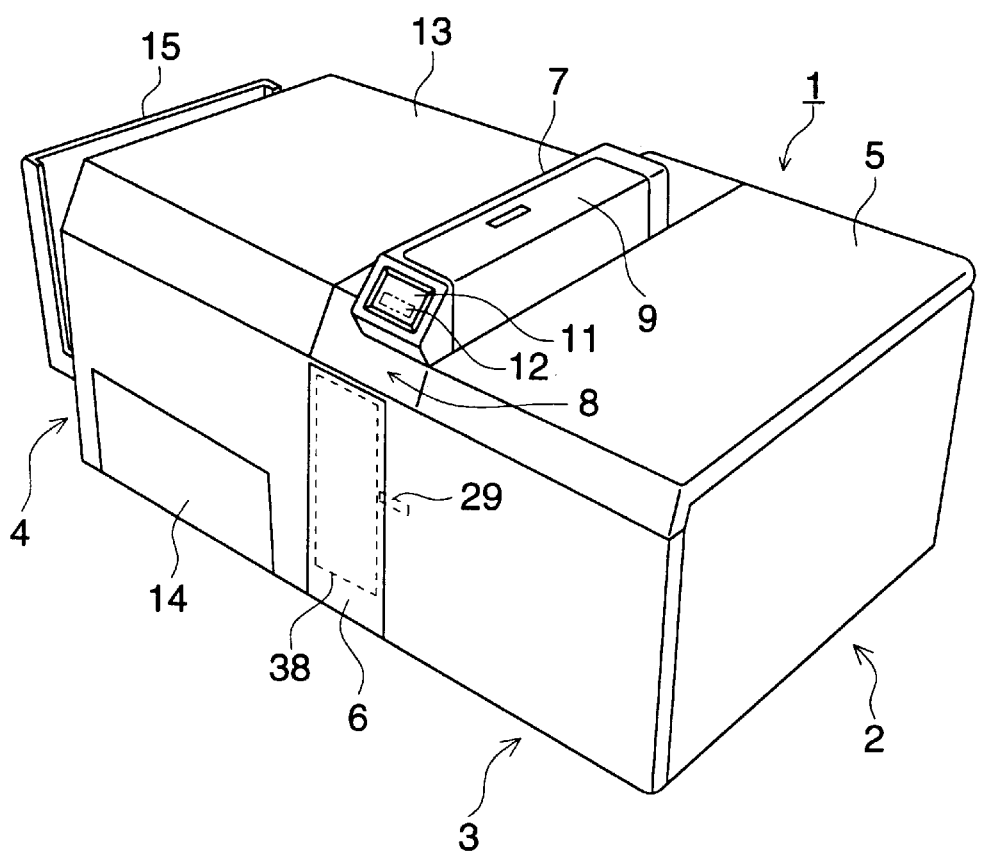
FIG. 24 is a perspective view of another embodiment of an image forming apparatus.
Figure 25:
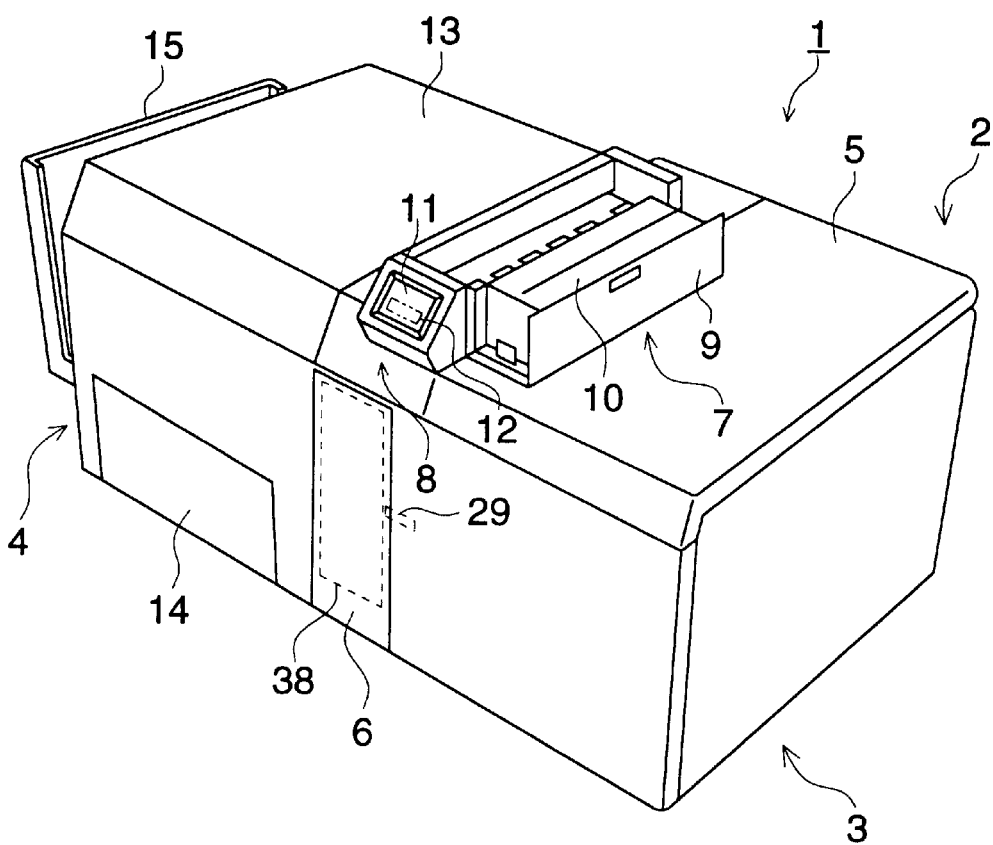
FIG. 25 is a perspective view of another image forming apparatus on which a paper feeding cover is opened.

FIGS. 24 and 25 show other embodiment of apparatus main body 2 of image forming apparatus 1. In the present embodiment, recording paper loading section 7 is arranged on the part of developing unit 4 over exposing apparatus 3 and operation section 8 is arranged on the front side of apparatus main body 2 with regard to the recording paper loading section 7. On the recording paper loading section 7, there is provided paper-feeding cover 9 to be capable of being opened and closed. As shown in FIG. 25, when the paper-feeding cover 9 is opened, cartridge 10 containing therein light-sensitive material (hereinafter referred to as a paper or a light-sensitive material) representing a recording paper can be set. On the operation section 8, there are provided liquid crystal panel 11 and touch panel 12.

Next, the second example of drum 31 of the exposure apparatus relating to the present embodiment will be explained, referring to FIGS. 26 and 27.

Figure 26:
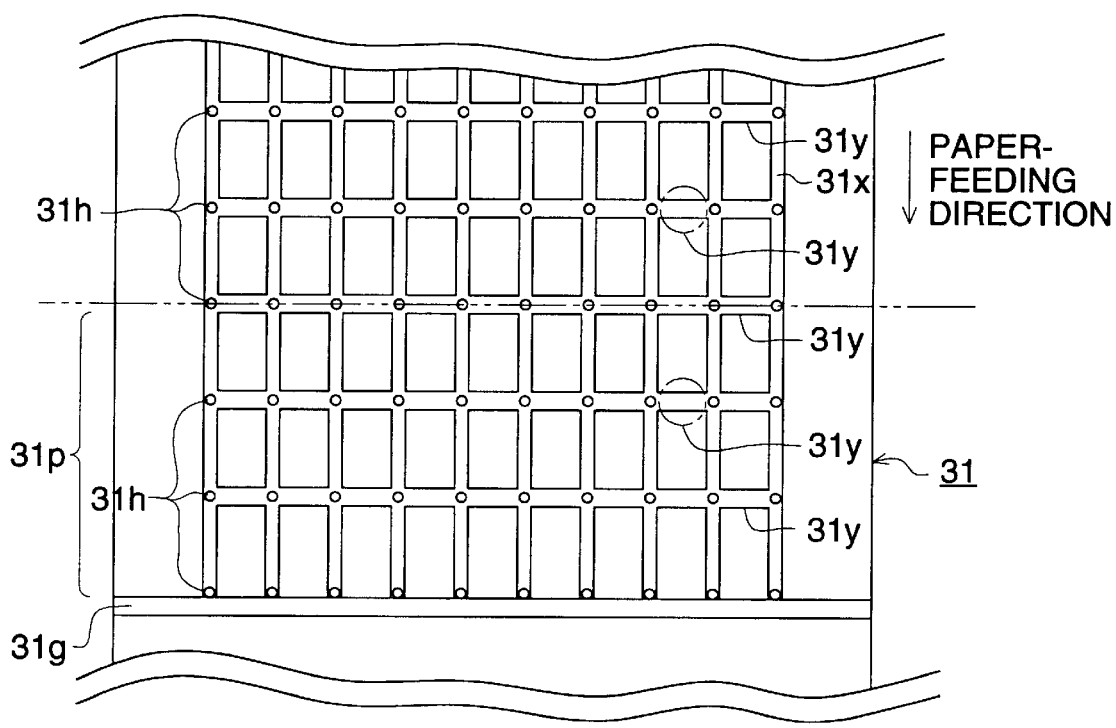
FIG. 26 is a developed view of a peripheral surface of the drum in the second example.

FIG. 26 is a development of a drum circumferential surface in the second example.

Figure 27:
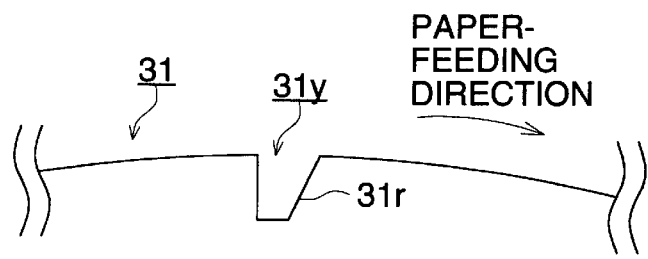
FIG. 27 is a cross sectional view showing a suction hole connecting groove in a direction of the rotating axis of the drum provided on the drum peripheral surface in the second example.

FIG. 27 is a sectional view of a suction communicating groove in the rotary shaft direction of a drum which is provided at the position on the drum circumferential surface in the second example where a paper touches the surface when feeding the paper.

In the sectional view of suction communicating groove 31y in the rotary shaft direction of drum 31 provided on portion 31p of drum circumferential surface 31p where sheep P touches when the paper is fed, a side of the groove located at the upstream side in the paper-feeding direction is at right angles to the circumferential surface of drum 31, but a side of the groove 31r located at the downstream side in the paper-feeding direction is inclined to the circumferential surface of drum 31 as shown in FIG. 27.

Therefore, the leading edge of a paper can easily get out of the groove again without being caught by suction communicating groove 31y even when the leading edge of a paper enters the suction communicating groove 31y when the paper is fed.

Figure 28:
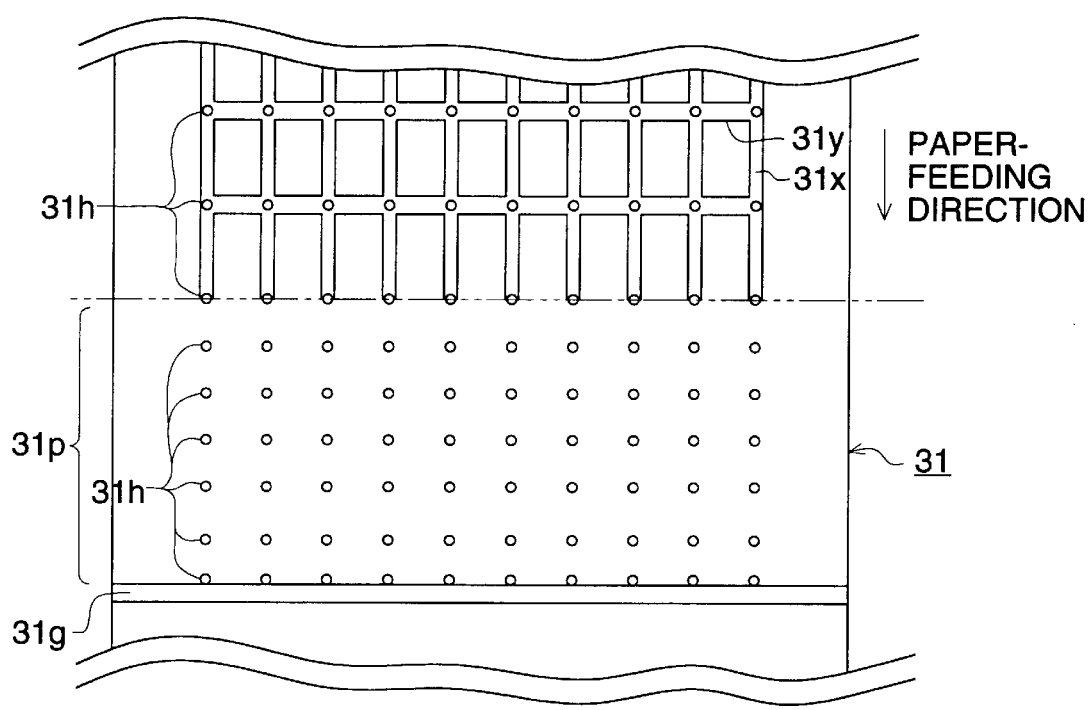
FIG. 28 is a developed view of a peripheral surface of the drum in the third example.

Next, the third example of a drum of the exposure apparatus relating to the present embodiment will be explained, referring to FIG. 28. FIG. 28 is a development of a drum circumferential surface relating to the present embodiment.

On the drum in the third example, there are not provided suction communicating grooves on portion 31p of the circumferential surface of drum 31 which is touched by the vicinity of the leading edge of paper P, but, instead, more suction holes 31h are provided on portion 31p where a paper touches the circumferential surface of drum 31 when the paper is fed, compared with other circumferential surface of drum 31, so that uniformity of air suction force may be kept.

Due to this structure, it is possible to prevent paper-feeding failure which might be caused when the leading edge of a paper is caught by suction communicating grooves 31y which are in the rotary shaft direction when the paper is fed to the drum 31.

Incidentally, it is preferable that the rate of an area occupied by suction holes to the holding area on the surface of drum 31 is 0.01% or more (in particular, 0.02% or more), because a loss of suction pressure is small, holding efficiency by suction is bettered, and it is possible to prevent that a part of the area is lifted. It is further preferable that the rate of an area occupied by suction holes to the holding area on the surface of drum 31 is 5% or less (in particular, 1% or less), because stiffness of the drum is less affected, holding efficiency by suction is sufficient, air leakage through the area other than the small-sized paper is less in the case of multi-size in particular, and a small-sized paper can be held sufficiently even when it is rotated at high speed. In the unit of the present embodiment, there are provided about 300 suction holes each having a diameter of about 1.4 mm on the holding area on the surface of drum 31. Therefore, the rate of the area occupied by suction holes to the holding area on the surface of drum 31 is about 0.03% in the unit of the present embodiment.

It is preferable that density of suction holes on the holding area on the surface of drum 31 is 50 holes/$M^2$ or more (in particular, 100 holes/$M^2$ or more) from viewpoints of stable suction and uniform suction of light sensitive paper P, and is 100000 holes/$M^2$ or less (in particular, 10000 holes/$M^2$ or less) from viewpoints of manufacturing cost for drum 31 and suction force per one suction hole. In the unit of the present embodiment, density of suction holes on the holding area on the surface of drum 31 is about 200 holes/$M^2$.

Incidentally, though the rotating speed up to 3000 rpm is used for exposure conducted in the exposure apparatus of the present embodiment, the rotating speed of 3000 rpm or more can also be used for the exposure in the invention.

It is preferable that a size of the paper which has been cut is 0.06 $m^2$ or more (in particular, 0.12 $m^2$ or more). Due to this, in the case of making a color proof, this size is one which makes reproduction of a printed matter possible. Further, 3 $m^2$ or less (in particular, 2 $m^2$ or less) is preferable. Due to this, color proof for most printing is possible, a unit can be made small, and weight for obtaining the necessary mechanical strength can be made to be at the level which makes it unnecessary to select the installation location.

A paper width which is 0.25 m or more (in particular, 0.5 m or more) is preferable. This is a size which makes reproduction of printed matters possible. Further, the paper width which is 2 m or less (in particular, 1.5 m or less) is preferable. Due to this, a size of the drum in its axial direction can be made small while making color proof for most printing possible, thus, the weight for obtaining structural accuracy and strength necessary for the drum itself, a drum mounting section and the optical scanning section can be made small to the level which makes it unnecessary to select the installation location.

In addition, a paper length which is 0.25 m or more (in particular, 0.5 m or more) is preferable. This is a size which makes reproduction of printed matters possible. By making it to be 2 m or less (in particular, 1.5 m or less) further, a size of the drum in its radial direction can be made small while making color proof for most printing possible, and an influence of thermal expansion of the drum is small, and it is easy to obtain machining accuracy, and weight for obtaining the necessary structural accuracy and strength can be made to be at the level which makes it unnecessary to select the installation location.

EXAMPLE

Example

A color proof was produced by the use of the drum of the third example of the embodiment with the apparatus of the embodiment, by exposing the entire surface of A2-size paper P based on halftone dot image data of 50% screen tint, while changing the rotating speed used for rotating the drum at constant rotating speed as shown in the table.

Comparative Example 1

Figure 29:
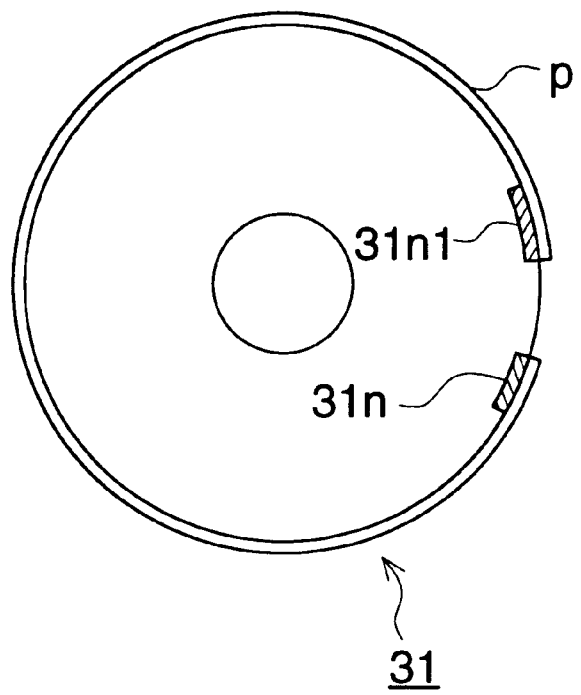
FIG. 29 is a diagram for illustrating how to fix a paper on a drum.

A color proof was produced by the use of adhesive members 31m and 31n which are provided as shown in FIG. 29 to fix both ends of a paper in the rotational direction, and hold the paper fixedly through adhesion, in place of the drum of the embodiment, by exposing the entire surface of A2-size paper based on halftone dot image data, while changing the rotating speed used for rotating the drum at constant rotating speed as shown in the table.

Comparative Example 2

A color proof was produced by the use of a chucking mechanism which is provided to fix both ends of a paper in the rotational direction, and holds the paper fixedly by holding the both ends of the paper in the rotating direction, in place of the adhesive members 31m and 31n in Comparative Example 1, by exposing the entire surface of A2-size paper based on halftone dot image data, while changing the rotating speed used for rotating the drum at constant rotating speed as shown in the table.

As a result, image unevenness was not observed despite the high rotating speed of the drum when the exposure apparatus relating to the invention was used, while good results were not obtained for the rotating speed of the drum of 1200 rpm or higher in Comparative Examples. Results of evaluation

TABLE 1

| Rotating speed | Example | Comparative Example 1 | Comparative Example 2 |
| --- | --- | --- | --- |
| 600 rpm | A | A | A |
| 1200 rpm | A | D | C |
| 1800 rpm | A | F | E |
| 2400 rpm | A | F | E |
| 3000 rpm | A | F | E |

Evaluation

A: No unevenness is observed under the careful observation.

B: Under the careful observation, there is observed unevenness which is not problematic.

C: Slight unevenness is observed in several locations.

D: Clear unevenness comes into existence sporadically.

E: Unevenness comes into existence on the entire area of the central portion

F: A paper was separated and damaged.

The invention makes it possible to repress that a sheet-shaped silver halide photographic light-sensitive paper is lifted or is caused to exceed a depth of field for a light beam even when a drum holding the sheet-shaped silver halide photographic light-sensitive paper fixedly is rotated at high speed of 1200 rpm or higher, and thereby to obtain images of high image quality.

It is also possible to obtain a reliable color proof when producing a color proof.

A clearance in the specific direction between the cover and the cylinder is made to be broader, and thereby, the recording paper which has come off the cylinder due to the high speed rotation, for example, can stay there, thus, even when the recording paper comes off the cylinder, a user can remove it easily and safely, and productivity of the recording apparatus can be improved.

A jam clearance opening is arranged on the lower part of the cover, the clearance between the cylinder and the cover is made to be uniform at both the upper left side and the upper right side, and an inclined surface in the direction of a tangent line which is tangential to the curved surface of the cylinder is provided, while, on the lower portion, there is provided a space where a recording paper coming off the cylinder can stay. Further, in the case of the structure of a narrow clearance and of an inclined surface, even when a recording paper comes off due to high speed rotation and hits the cover, the recording paper can go through the clearance without being broken because the clearance is narrow, then, the recording paper is separated completely from the cylinder to leave therefrom at the lower portion where the clearance is great, then, it hits the inner wall of the cover and falls because it can not follow the rotation any further, and it can be removed easily through the jam clearance opening.

Since a buffer is provided on each of a recording light emergent opening and a material ejection opening, it is possible to ease a shock with an edge of a recording paper and to prevent crush or snap of a recording paper.

Since each of a recording light emergent opening and a material ejection opening is formed to be inclined, it is possible to ease a shock with an edge of a recording paper and to prevent crush or snap of a recording paper.

Since a covering member which covers the top surface of the cover is provided on the outer upper portion of the cover, even when a user or a maintenance man drops machine screws, clips or pens accidentally, they are prevented by the covering member from entering the inside to fall to the lower part, thus, secondary damage can be made small.

Since the cylinder rotates on its column axis while holding fixedly a recording paper on a column-surface-shaped holding surface, an image recording surface of the recording paper passes through the prescribed position in the prescribed direction. Therefore, a clearance between the tip of the exposure head and the image recording surface of the recording paper can be made extremely accurate, accuracy for the position and direction of the exposure head to the image recording surface of the recording paper can be raised extremely, an image which is highly reproducible and is highly precise can be recorded, and thereby, a color proof which can be used favorably for proofreading can be produced.

The invention can be applied also to an image forming apparatus employing a thermosensible paper, a pressure sensitive paper or a plain paper as a recording paper, in addition to an image forming apparatus employing a light-sensitive material as a recording paper.

In the case of an image forming apparatus employing a light-sensitive material in the past, when a cover is opened during operations of the apparatus, external light enters the inside of the image forming apparatus to expose a light-sensitive material, resulting in a problem of wasteful consumption of light-sensitive materials. When conveyance can not be stopped immediately even by the interlocking switch mechanism, in particular, more light-sensitive materials are drawn out of the cartridge and are exposed to light, resulting in a problem of an increase in waste.

If the invention is applied to an image forming apparatus employing a light-sensitive material, however, it is possible to reduce waste of light-sensitive materials because reckless and unnecessary exposure is not conducted.

A technology to accelerate exposure has been advanced recently, which results in a tendency to increase the number of revolutions per a unit time of a drum. Therefore, the time to run idle is further increased. In the image forming apparatus employing a recording paper wound around a drum, in particular, when recording on a light-sensitive material having a large area, the drum is made to be greater, which increases weight of the drum and extends the time to run idle. It is therefore impossible to secure safety of operations by providing only the interlocking switch mechanism, which is a problem.

However, when the invention is applied to an image forming apparatus to record an image by conducting exposure, digital exposure, in particular, it is especially satisfactory.

That is, when it is necessary to remove a recording paper on an image forming apparatus, it was easy to remove, and it was possible to raise safety. It was further possible to improve reliability of the image forming apparatus, because no damage is given to the movable mechanism of the image forming apparatus.

What is claimed is:

1. An exposing apparatus comprising:
    a drum to fixedly hold a sheet-shaped light sensitive material onto an outer peripheral surface thereof by suctioning;
    a rotating driving means capable of rotating the drum at a rotational speed not less than 1200 rpm;
    an exposing means for exposing on the basis of image data the light sensitive material fixedly held on the outer peripheral surface of the drum rotated by the rotating driving means;
    a setting section to set the light sensitive material on a condition that the light sensitive material is wound in a roll form; and
    a conveyor for cutting the light sensitive material in such a manner that an outer surface of the roll-formed light sensitive material becomes an outer surface of the light sensitive material wound around the drum and for conveying the light sensitive material to the drum, wherein the rotational speed of the drum at the time that the light sensitive material is conveyed to the drum is lower than at the time that the exposing means conducts exposing.

2. The exposing apparatus of claim 1, wherein an area of the outer peripheral surface of the drum is not smaller than 0.12 m$^2$.

3. The exposing apparatus of claim 1, further comprising:
    a pump for conducting the suctioning, wherein the drum is provided with a plurality of holes on the outer peripheral surface thereof and the pump suctions the light sensitive material onto the outer peripheral surface of the drum through the plurality of holes.

4. The exposing apparatus of claim 1, wherein the diameter of the drum is 10 cm or more.

5. The exposing apparatus of claim 1, wherein the exposing means comprises an optical unit to generate plural beams and a sub-scanning means for moving the optical unit in a direction along the rotation axis of the drum.

6. The exposing apparatus of claim 5, wherein at least one of the plural beams generated by the optical unit is irradiated at a position different from that where other beams are irradiated.

7. The exposing apparatus of claim 5, wherein the optical unit generates plural laser beams as the plural beams.

8. The exposing apparatus of claim 1, wherein the image data are half tone dot image data.

9. The exposing apparatus of claim 1, wherein the light sensitive material is a silver halide photographic light sensitive paper.

10. The exposing apparatus of claim 9, wherein the silver halide photographic light sensitive paper is a color photographic light sensitive paper, the exposing means exposes the color photographic light sensitive paper with plural beams different in wavelength, the image data are obtained from image data for an electronic plate making process, and a color proof corresponding to the image data for the electronic plate making process is obtained by developing the exposed photographic color sensitive paper.

11. The exposing apparatus of claim 1, wherein the rotational speed of the drum is increased after the suctioning the light sensitive material onto the drum is started.

12. The exposing apparatus of claim 1, further comprising:
a roller provided to be capable of coming in contact with the drum or separating from the drum, wherein the roller brings the light sensitive material conveyed by the conveyor in close contact with the drum.

13. The exposing apparatus of claim 1, further comprising:
a casing in which the drum is accommodated, the casing provided with a door to open a part of the casing in the vicinity of the drum; and
a locking means to inhibit an action to open the door while the drum is rotated.

14. An exposing apparatus comprising:
a drum to fixedly hold a sheet-shaped light sensitive material onto an outer peripheral surface thereof by suctioning;
a rotating driving means capable of rotating the drum at a rotational speed not less than 1200 rpm;
an exposing means for exposing on the basis of image data the light sensitive material fixedly held on the outer peripheral surface of the drum rotated by the rotating driving means; and
a cover to enclose around the drum, wherein the cover is provided with an exposing opening through which the drum is exposed with the beams and an ejecting opening through which the light sensitive material is ejected from the drum and an escaping section to eliminate a jamming light sensitive material is formed by making a gap between the cover and the drum wider in a predetermined direction.

15. The exposing apparatus of claim 14, wherein the cover is provided with
a jam-eliminating opening at a position beneath the drum,
slant surfaces slanted in the tangent direction to the peripheral surface of the drum at an upper right portion and an upper right portion wherein a gap at the upper left portion between the cover and the drum is equal to a gap at the upper right portion, and
a space at which the light sensitive material peeled from the drum can stay, and
wherein the space is communicated with the jam-eliminating opening.

16. The exposing apparatus of claim 14, wherein the exposing opening and the ejecting opening are provided with a cushion member respectively.

17. The exposing apparatus of claim 14, wherein the exposing opening and the ejecting opening are shaped in a taper form respectively.

18. The exposing apparatus of claim 14, wherein the cover member is provided with an enclosing member to enclose the top portion of the cover member.

19. The exposing apparatus of claim 14, further comprising:
a casing in which the drum is accommodated, the casing provided with a door to open a part of the casing in the vicinity of the drum; and
a locking means to inhibit an action to open the door while the drum is rotated.

* * * * *